US012520024B2

(12) United States Patent
Bentley et al.

(10) Patent No.: US 12,520,024 B2
(45) Date of Patent: Jan. 6, 2026

(54) SERVICEABLE OVEN CAMERA MOUNT

(71) Applicants: BSH Home Appliances Corporation, Irvine, CA (US); BSH Hausgeräte GmbH, Munich (DE)

(72) Inventors: Garrett Bentley, Knoxville, TN (US); John Gibson, Pollocksville, NC (US); Shiva Kumar Ram Kumar, Bangalore (IN)

(73) Assignees: BSH Home Appliances Corporation, Irvine, CA (US); BSH Hausgeräte.GmbH, Munich (DE)

( * ) Notice: Subject to any disclaimer, the term of this patent is extended or adjusted under 35 U.S.C. 154(b) by 493 days.

(21) Appl. No.: 18/071,685

(22) Filed: Nov. 30, 2022

(65) Prior Publication Data

US 2024/0179389 A1 May 30, 2024

(51) Int. Cl.

| | |
|---|---|
| ***H04N 23/57*** | (2023.01) |
| ***F24C 15/00*** | (2006.01) |
| *F24C 7/08* | (2006.01) |
| *F24C 15/02* | (2006.01) |

(52) U.S. Cl.

CPC ........... *H04N 23/57* (2023.01); *F24C 15/006* (2013.01); *F24C 7/085* (2013.01); *F24C 15/021* (2013.01)

(58) Field of Classification Search

CPC ...... F24C 15/006; F24C 7/085; F24C 15/021; H04N 23/57

USPC .......................................................... 126/21 R

See application file for complete search history.

(56) References Cited

U.S. PATENT DOCUMENTS

| | | | | |
|---|---|---|---|---|
| 10,398,260 | B2 | 9/2019 | Park | |
| 10,591,218 | B2 * | 3/2020 | Abdoo | F24C 15/34 |
| 11,116,050 | B1 | 9/2021 | Bhogal | |
| 2018/0058702 | A1 * | 3/2018 | Jang | F27D 21/02 |
| 2019/0260915 | A1 * | 8/2019 | Armstrong | H05B 6/6411 |
| 2020/0166276 | A1 * | 5/2020 | Garuccio | F24C 7/085 |
| 2022/0120447 | A1 * | 4/2022 | Herlitzius | F24C 15/322 |

FOREIGN PATENT DOCUMENTS

| | | | | |
|---|---|---|---|---|
| CN | 110604480 A | | 12/2019 | |
| CN | 111588280 A | * | 8/2020 | |
| DE | 102008042804 A1 | * | 4/2009 | F24C 7/082 |
| EP | 3450853 B1 | | 2/2021 | |

OTHER PUBLICATIONS

DE 102008042804 A1—Translation (Year: 2009).*
CN 111588280 A—Translation (Year: 2020).*

* cited by examiner

*Primary Examiner* — Steven B Mcallister
*Assistant Examiner* — Benjamin W Johnson
(74) *Attorney, Agent, or Firm* — Michael E. Tschupp; Andre Pallapies; Brandon G. Braun

(57) ABSTRACT

An oven is disclosed, including a mounted imaging system disposed in a compartment configured to be accessed by way of one or more removable covers (e.g., a top panel, an inner removable service cover, and/or an outer removable service cover). The mounted imaging system is configured to illuminate an interior of a cooking cavity and/or provide an image and/or video of the interior of the cooking cavity. The compartment provides targeted cooling to components of the mounted imaging system due to an airflow pathway set up by one or more baffles or wall structures. The airflow pathway is disposed relative to a fan of the oven such that the system is configured to pull ambient air from a side of the oven into the oven via a plurality of cooling vents.

18 Claims, 15 Drawing Sheets

SERVICEABLE OVEN CAMERA MOUNT

FIELD

This disclosure relates to systems and methods for oven imaging systems. More specifically, the disclosed embodiments relate to oven mounted imaging systems capable of viewing the oven interior.

INTRODUCTION

The use of imaging and monitoring systems integrated into ovens has increased the efficiency and convenience of oven usage, but has also increased the difficulty of servicing due to the sensitive nature of the added components. Ovens with monitoring or imaging systems often have issues with components overheating due to their proximity to the oven cavity, exposure to heat generated by the oven's heating elements, and/or inefficient ventilation, resulting in a need for frequent servicing. Ventilation and cooling of oven components is often accomplished by drawing outside air into the oven compartments through vents in an oven door. However, air pulled in through the oven door may often not have the desired cooling effect due to the proximity of heating elements.

Servicing components of an oven is often a difficult and strenuous activity that, if not done correctly, can cause damage to the oven and/or the person servicing the oven. In most conventional ovens, a majority of the oven's components are often only accessible through a back panel of the appliance, such that if an oven is situated against a wall or in a cabinet it must first be pulled out of the cabinet and/or away from the wall before any evaluating or servicing can commence. However, ovens are usually quite heavy, often weighing between 80 to 500 lbs depending on size.

SUMMARY

The present disclosure provides systems, apparatuses, and methods relating to an oven with a serviceable mounted imaging system accessible by way of a removable cover.

In some embodiments, a cooking appliance of the present disclosure includes: an insulated cooking cavity having an opening selectively closed by an access door on a front side of the cooking appliance; an air mover disposed inside the cooking appliance above the insulated cooking cavity, the air mover configured to force air through one or more exhaust ports of the cooking appliance; an imaging device mounted in a compartment above the insulated cooking cavity and extending into the insulated cooking cavity, such that an interior of the insulated cooking cavity is viewable by the imaging device; and a first air intake disposed in a lateral wall of the cooking appliance, the first air intake configured to receive air into the cooking appliance from a space external to the cooking appliance; wherein the compartment is in fluid communication with an inlet of the air mover and with the first air intake, such that an airflow pathway extends from the first air intake through the compartment to the one or more exhaust ports.

In some embodiments, a cooking appliance of the present disclosure includes: a cooking cavity having an opening on a front side of the cooking appliance; a cooling fan disposed inside the cooking appliance above the cooking cavity; one or more exhaust ports in fluid communication with the cooling fan; a camera mounted in a compartment above the cooking cavity such that an electronics portion of the camera is disposed in the compartment and a lens portion of the camera extends into the cooking cavity; and a first air intake disposed in an upper portion of a lateral wall of the cooking appliance; wherein the cooling fan is configured to draw air from the first air intake through the compartment, and to exhaust the air through the one or more exhaust ports.

Features, functions, and advantages may be achieved independently in various embodiments of the present disclosure, or may be combined in yet other embodiments, further details of which can be seen with reference to the following description and drawings.

DETAILED DESCRIPTION

Figure 1:
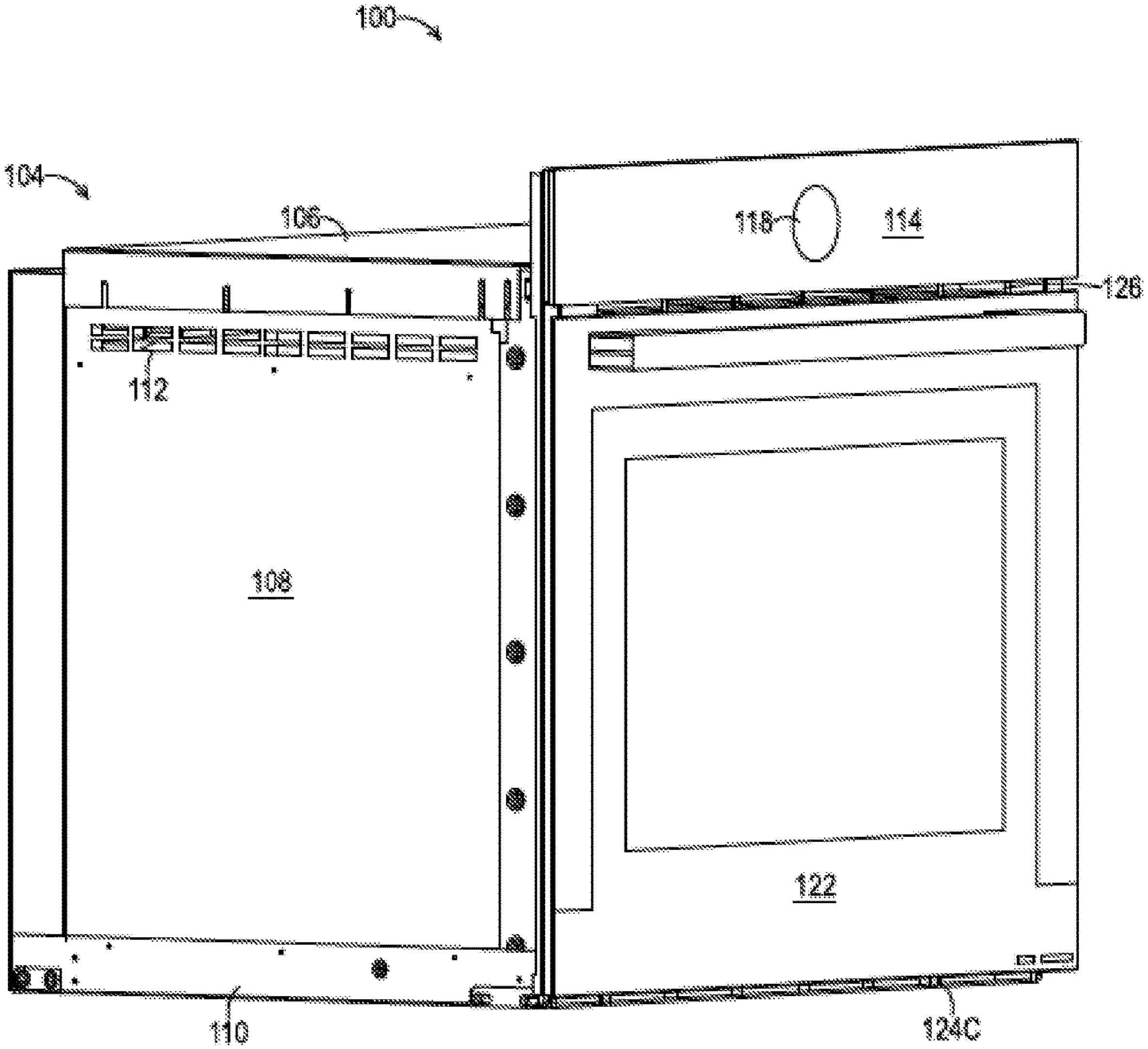
FIG. 1 is an isometric view of an illustrative oven with a mounted imaging system in accordance with aspects of the present disclosure.

Various aspects and examples of an oven having a mounted and cooled imaging system accessible by way of a removable service cover, as well as related systems and methods, are described below and illustrated in the associated drawings. Unless otherwise specified, mounted and cooled imaging systems in accordance with the present teachings, and/or their various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an oven according to the present teaching may include a mounted imaging system for viewing an interior of the oven. The imaging system or camera is disposed at least partially within a compartment accessible by way of one or more removable covers (e.g., an inner removable service cover and/or an outer removable service cover), to facilitate servicing of one or more components of the mounted imaging system. The oven is further configured to provide targeted cooling to components of the mounted imaging system by providing a compartment airflow pathway.

The mounted imaging system may include an imaging device (AKA camera assembly), one or more lighting assemblies, and/or mounted imaging processing logic. The camera assembly may include a camera body coupled on one end to a lens housing (AKA lens portion) having one or more lenses, a flexible printed circuit (FPC) cable, and/or a welded camera mounting plate. The welded camera mounting plate may be welded to the lens housing at an angle to provide the camera with a selected field of view of the interior of the oven. Each of the one or more lighting assemblies may include an LED disposed in an LED housing. The mounted imaging computer may include a trusted computer base (TCB), a TCB mounting bracket configured to securely receive the TCB, and/or any other suitable connectors. The TCB may include a plurality of heat sinks disposed on a top and/or bottom surface of the TCB and configured to dissipate heat away from the TCB. The TCB may be connected to the camera assembly by the FPC cable and/or connected to the LED assembly by the plurality of cables.

Ovens of the present disclosure include an exterior housing (AKA oven body) having a removable top panel, removable lateral walls, and a base frame portion (AKA oven base). The removable top panel is detachably coupled to upper portions of the oven base and/or removable lateral walls at one or more fastening locations. The oven further includes a plurality of cooling air intake vents disposed in a top half of the lateral walls below the fastening locations. The cooling vents are configured to allow the passage of cool external ambient air into an interior space of the oven to cool components of the oven. The oven base includes an oven control panel and an insulated cooking cavity (AKA oven interior). The cooking cavity is accessible through an opening arranged on a front side of the oven base. An oven door (AKA access door) may be coupled to the oven base and configured to selectively cover the opening of the cooking cavity. In some examples, the oven body may further include a hob disposed above the cooking cavity.

The cooking cavity may include a plurality of fastening apertures, a camera aperture, and/or one or more second LED aperture(s) configured to allow a portion of the camera assembly and/or lighting assembly to pass between an exterior side of the cooking cavity and an interior side of the cavity to enable the LED and camera to light and view the cavity interior, respectively. In some examples, the camera is placed such that the aperture is disposed adjacent an upper front right corner of the cooking cavity (where front, right, and other oven-related directions used herein are from the perspective of the oven). In some examples, the welded camera mounting plate is coupled to the outer shell of the cooking cavity around the camera aperture to secure the lens housing to the cooking cavity at an angle. In some examples, the one or more second LED aperture(s) are disposed along upper right and/or left sections of the cooking cavity.

The oven base and/or oven door may include one or more sets of air intake vents. The air intake vents may be formed in a periphery of the cooking cavity, adjacent the periphery of the cooking cavity, in an upper inner surface of the oven door, in a back surface of the oven base, and/or in any other suitable location. The air vents allow passage of air from a surrounding environment (e.g., a kitchen) into the interior space of the oven to facilitate the cooling of oven components. The oven base further includes a plurality of exhaust vents (AKA exhaust ports) disposed in a front upper surface of the oven base above the cooking cavity opening and below the oven control panel. The exhaust vents allow warm air gathered in an interior space of the oven to pass out of the oven and into the surrounding environment.

The oven further includes an air channel exhaust plate, an air conduction plate, and an upper insulation retainer. These components of the oven are arranged such that the upper insulation retainer is disposed above the cooking cavity, the air conduction plate is disposed above the upper insulation retainer, and the air channel exhaust plate is disposed above the air conduction plate. The removable top panel is disposed above the air channel exhaust plate and configured to enclose the oven. The oven may further include a pair of airflow separators disposed between and coupled to the upper insulation retainer and the air conduction plate to form the compartment. In some examples, components of the mounted imaging system are mounted to and/or coupled to an outer shell of the cooking cavity, the upper insulation retainer, and/or the air conduction plate. In some examples, one or more components of the mounted imaging system are mounted to the upper insulation retainer within the compartment.

In some examples, the compartment comprises an internal space disposed adjacent an upper right front corner of the oven. The compartment is defined between an upper surface of the upper insulation retainer, a lower surface of the air conduction plate, and inner surfaces of the airflow separators. The pair of airflow separators include an inner airflow separator and an outer airflow separator, each having an elbow or bend forming a first arm portion that transitions into a second arm portion. The inner and outer airflow separators have a boomerang-shaped cross-section, such that (being disposed opposite one another) the two airflow separators form four walls of the compartment. Top and bottom edges of the airflow separators follow the changing contours of the upper insulation retainer and the air conduction plate, such that the airflow separators have a shape corresponding to the contour of a section of the air conduction plate and/or upper insulation retainer.

The compartment may include two service openings covered and/or sealed by the one or more removable service covers. In some examples, the air conduction plate includes a first service opening disposed over at least a portion of the compartment and configured to allow a user easy access to components of the mounted imaging system disposed in the compartment beneath the air conduction plate (e.g., for easy installation and/or servicing). In some examples, the upper insulation retainer also includes a second service opening disposed under at least a portion of the compartment and configured to allow a user easy access to components of the mounted imaging system disposed beneath the upper insulation retainer.

The oven may further include the outer removable service cover, fastened to the air conduction plate over the first service opening and/or the inner removable service cover coupled to the upper insulation retainer over the second service opening. The inner and outer removable service covers have a size and shape corresponding to the size and shape of the first and second service openings, such that the inner and outer removable service covers seal the first and second service openings when coupled to their respective surfaces. The outer removable service cover may comprise a sturdy heat-resistant material while the inner removable service cover may comprise a flexible heat-resistant material such as silicone and/or any other suitable material.

In some examples, components of the mounted imaging system that are coupled to the outer shell of the cooking cavity may include a top section which extends into the compartment (e.g., through the second service opening). As such, the inner removable service cover may include one or more mounting aperture(s) centrally disposed through a top surface of the inner removable service cover and one or more slits or slots extending from a periphery of the one or more mounting apertures to an outer edge of the inner removable service cover. Each of the one or more slits in the inner removable service cover form a pair of inward-facing flexible flaps configured to allow insertion of a portion of the top section of the components of the mounted imaging system into the one or more mounting apertures. The pair of inward-facing flexible flaps are resilient features configured to easily bend and reform around the portion of the top section that is pushed through the slit and into the one or more mounting apertures. The one or more mounting apertures receive and hold the portion of the top section, such that the remainder of the top section of the components of the mounted imaging system may be securely disposed in the compartment. As such, the one or more mounting aperture(s) allow the top section of the components of the mounted imaging system to be disposed above the inner removable service cover, such that they may receive the cooling benefits of the compartment while having a bottom section disposed outside of the compartment.

The oven further includes a cooling system. The cooling system may include a centrifugal fan and/or any other suitable fan or air mover configured to force air through one or more of the plurality of exhaust vents. In some examples, the cooling system includes a centrifugal fan configured to draw cool air into the oven from an exterior surrounding by way of the cooling vents and/or the one or more sets of air intake vents, and to expel warm air from the inside of the oven into the exterior surrounding by way of the plurality of exhaust vents. The cooling fan creates a plurality of airflow pathways through the oven via one or more other components of the oven (e.g., the pair of airflow separators, air conduction plate, upper insulation retainer, air channel exhaust plate, etc.), wherein the pathways are configured to dissipate heat from components of the oven to prevent overheating and degradation. In some examples, the plurality of airflow pathways includes a main airflow pathway that is circulated through the whole oven and the compartment airflow pathway which provides targeted cooling to components of the mounted imaging system disposed within the compartment.

The centrifugal fan is disposed in a top surface of the air channel exhaust plate. The air channel exhaust plate has peripheral walls and/or a plurality of downward-bent peripheral portions that together with a top surface of the air conduction plate form a ducted housing. In some examples, the ducted housing may include a peripheral wall that extends around and partially encircles a back side of the cooling fan, and the plurality of downward-bent peripheral portions are disposed on the air channel exhaust plate such that they extend between the ends of the peripheral wall and a back surface of an upper portion of the oven adjacent the plurality of exhaust vents. As such, the ducted housing by way of the cooling fan and plurality of exhaust vents is configured to receive warm air pulled up through a fan air inlet disposed in the air conduction plate opposite the cooling fan and direct the received air toward the plurality of exhaust vents where the warm air is expelled into the surrounding environment.

The compartment further includes a compartment air inlet and a compartment air outlet formed between surfaces of the air conduction plate, upper insulation retainer, and/or the pair of airflow separators. In some examples, the compartment air inlet is disposed in a front right underside of the compartment and configured to bring cool air into the compartment. In some examples, the compartment air outlet is disposed in a back left corner of the compartment and configured to allow passage of air out of the compartment and into a main air channel that passes between the air conduction plate and the upper insulation retainer without going through the compartment. In some examples, the compartment air outlet is formed in a gap between ends of the second arms of the inner and outer airflow separators, the air conduction plate and the upper insulation retainer. By way of the compartment air outlet and the main air channel, the compartment airflow pathway and the primary airflow pathway converge into a single airflow pathway which is then pulled up into the ducted housing and expelled into the surround environment.

In some examples, the compartment air inlet is configured to separate incoming cool air from the accumulated warm air present in the internal space of the oven, such that only cool air is used to cool components of the mounted imaging system. The compartment air inlet formed through a front right underside of the compartment may be arranged in a manner that only allows denser cool air to flow into the compartment while less dense warmer air is deflected off an outer side of the outer airflow separator. This airflow separation generates a secondary airflow pathway (AKA compartment airflow pathway) which passes through the compartment air inlet and into the compartment to cool components of the mounted imaging system disposed within the compartment before merging with the main airflow pathway.

The air conduction plate, upper insulation retainer, one or more removable service covers, and the pair of airflow separators together form the compartment configured to at least partially surround and facilitate improved ventilation and cooling of heat-sensitive components of the mounted imaging system. The compartment is configured such that it is accessible by way of the outer removable service cover and first service opening in the air conduction plate. The compartment is further configured to give access to components of the camera assembly disposed under the compartment and/or coupled to an outer shell of the cooking cavity by way of the inner removable service cover and second service opening. As such, in some examples, components of the mounted imaging system are accessible to a user by removing the removable top panel of the oven, removing the outer removable service cover to access components of the LED assembly and mounted imaging computer, and removing the inner removable service cover to gain full access to components of the camera assembly.

Examples, Components, and Alternatives

The following sections describe selected aspects of an illustrative oven with a serviceable mounted imaging system as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Oven with Serviceable Mounted Imaging System

As shown in FIGS. 1-18, this section describes an illustrative oven 100 with a mounted imaging system 102. Oven 100 is an example of the ovens described in the overview above.

Figure 3:
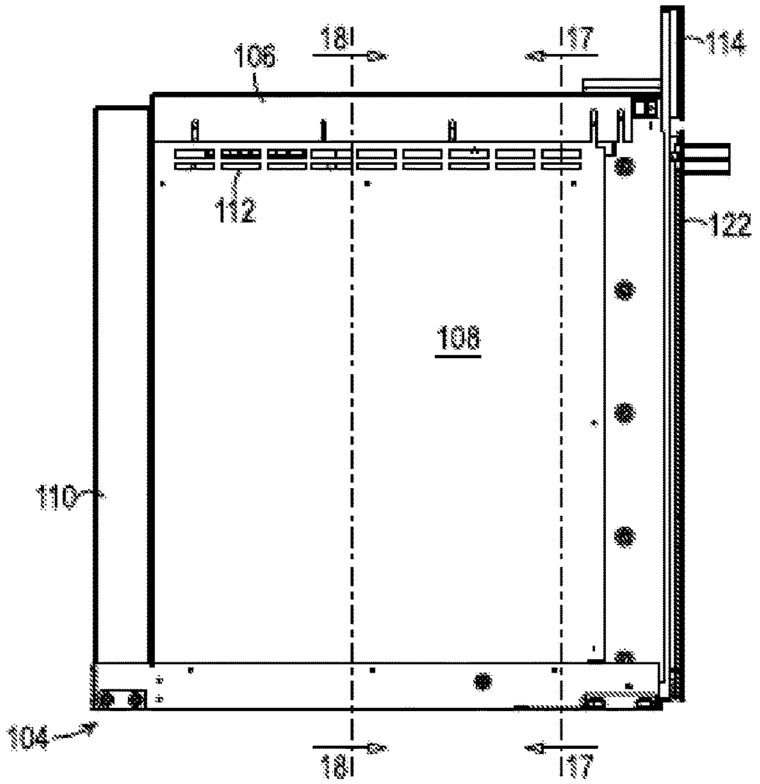
FIG. 3 is a side view of the oven of FIG. 1

Oven 100 includes an exterior housing (AKA oven body) 104 having a removable top panel 106, removable lateral walls 108, and a base portion (AKA oven base) 110. In some examples, removable top panel 106 includes a main cover portion and a plurality of (e.g., two) downward flanges. These flanges are configured to couple to upper portions of oven base 110 and/or removable lateral walls 108 at one or more fastening locations. As depicted in FIGS. 1 and 3, oven 100 further includes a plurality of cooling air intake vents 112 disposed in a top half of the lateral walls below the fastening locations, the plurality of cooling vents configured to allow the passage of cool ambient air from a lateral side of oven 100 into an interior space of the oven to cool components of the oven. Oven base 110 may include an oven control panel 114 and an cooking cavity 116 (AKA the oven interior).

In this example, oven control panel 114 is disposed on a front side of oven base 110, such that the control panel is visible and accessible to a user. Oven control panel 114 may include any suitable device(s) configured to display information, such as a timer, a signal light, and/or any other suitable components. Oven control panel 114 may include a user interface 118 in communication with an oven controller and configured to allow a user to control one or more aspects of the oven's operation. In some examples, user interface 118 comprises a plurality of control features configured to allow a user to control elements and/or systems of oven 100. The control features of user interface 118 may include one or more control knobs, buttons, switches, screens, touchpads, and/or any other suitable device(s).

Figure 4:
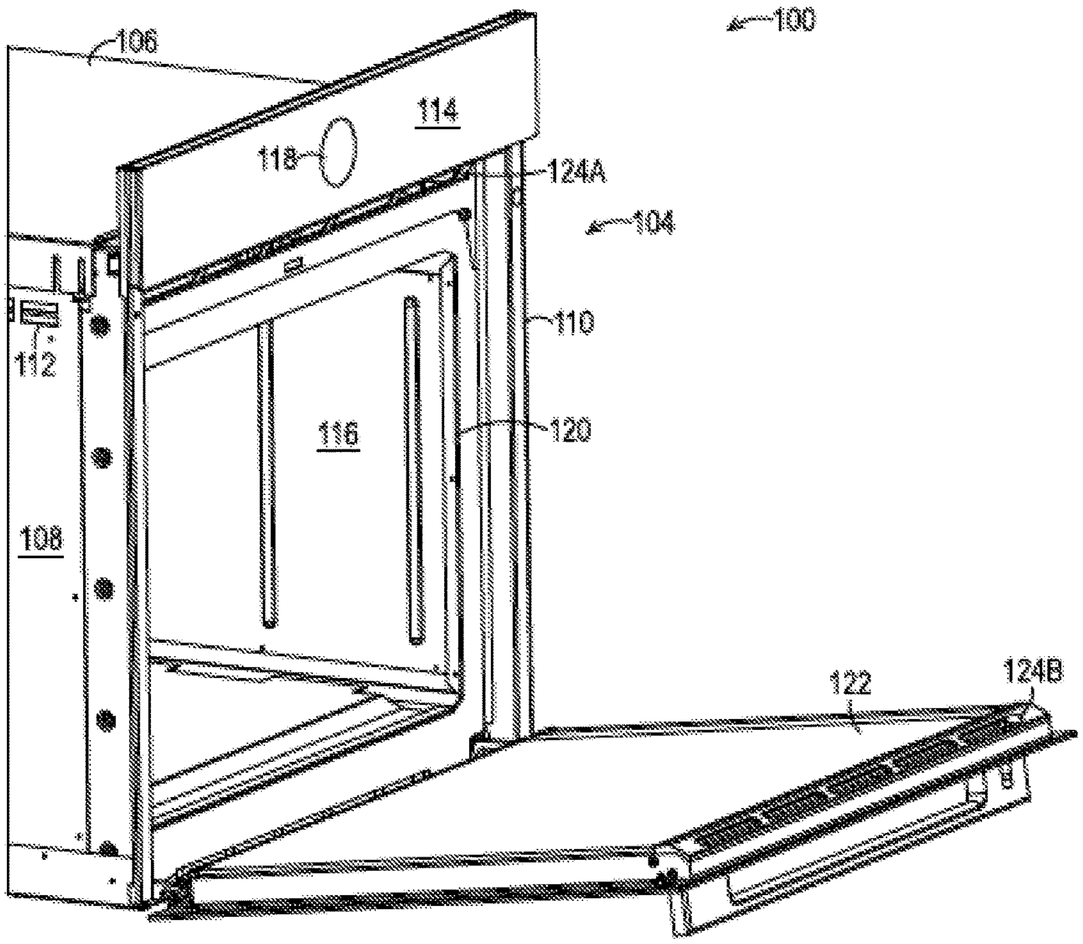
FIG. 4 is an isometric view of the oven of FIG. 1 depicting an oven door in an open configuration.
Figure 5:
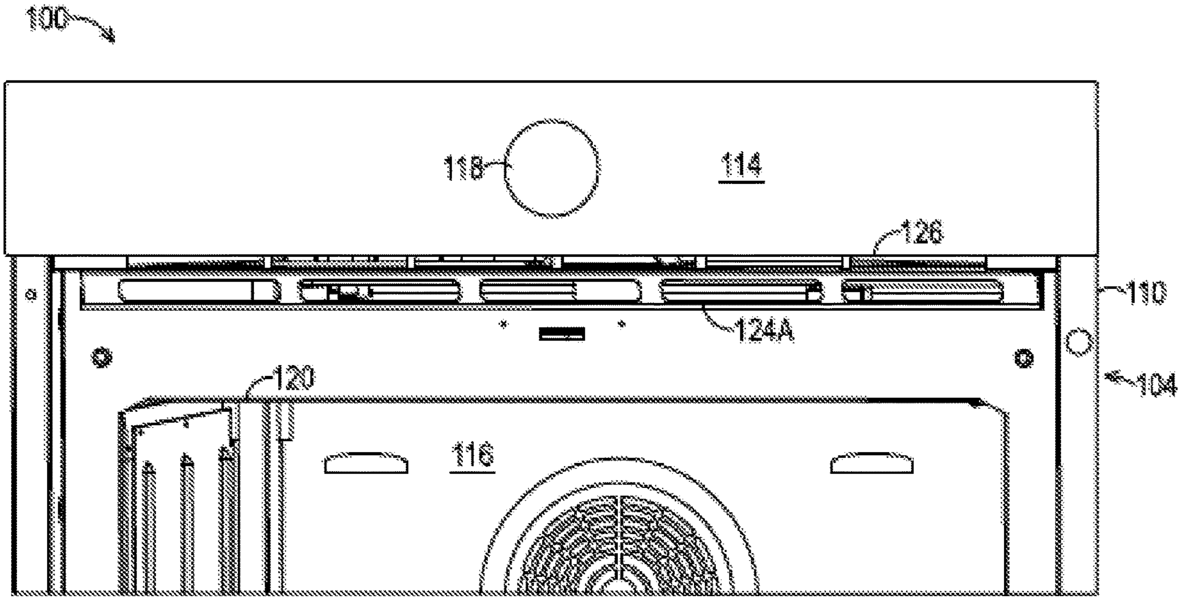
FIG. 5 is a partial isometric front view of the oven of FIG. 1, depicting a plurality of vents of the oven in accordance with aspects of the present disclosure.

As shown in FIGS. 4 and 5, cooking cavity 116 is accessible through an opening 120 arranged on a front lower surface of oven base 110. An oven door 122 (AKA access door) is coupled to oven base 110 and configured to selectively cover the opening of cooking cavity 116. FIGS. 4 and 5 depict oven 100 with oven door 122 open. Oven door 122 may be coupled to oven base 110 by any suitable hinge(s) and/or other devices configured to allow the door to be selectively opened to expose the cavity and closed to close the cavity.

Figure 2:
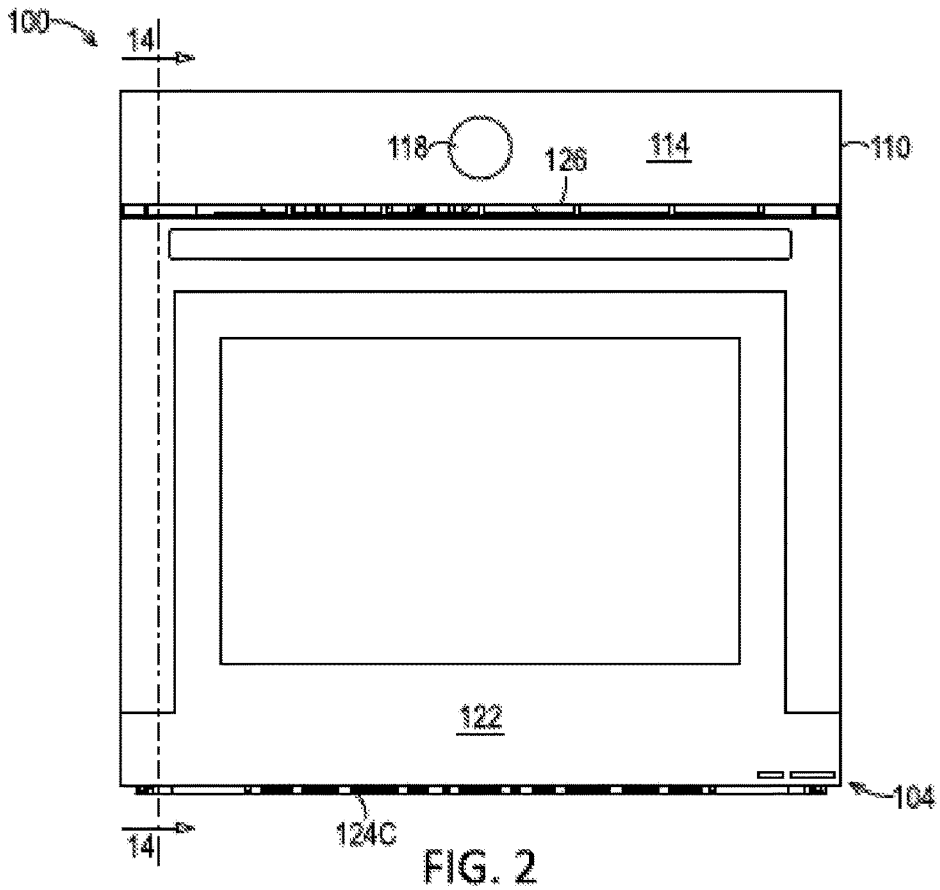
FIG. 2 is a front view of the oven of FIG. 1

Oven base 110 and/or oven door 122 further include one or more sets of air intake vents 124. As depicted in FIGS. 2, 4, and 5 the one or more sets of air intake vents (e.g., 124A, 124B, 124C, 124D) may be formed in a protruding surface disposed adjacent a top edge of the cooking cavity opening, in an upper inner surface of the oven door, in a front surface of the oven base below a bottom edge of the cooking cavity, in a back surface of the oven base, and/or in any other suitable location. The one or more sets of air vents facilitate the passage of air from a surrounding environment into an interior space of oven 100 to facilitate the cooling of oven components.

As depicted in FIGS. 2 and 5, oven base 110 further includes a plurality of exhaust vents 126 (AKA exhaust ports) disposed in a front upper surface above a top edge of cooking cavity opening 120 and below oven control panel 114. The plurality of exhaust vents 126 are configured to allow passage of warm air gathered in a ducted housing of oven 100 out of the oven and into the surrounding environment.

Figure 6:
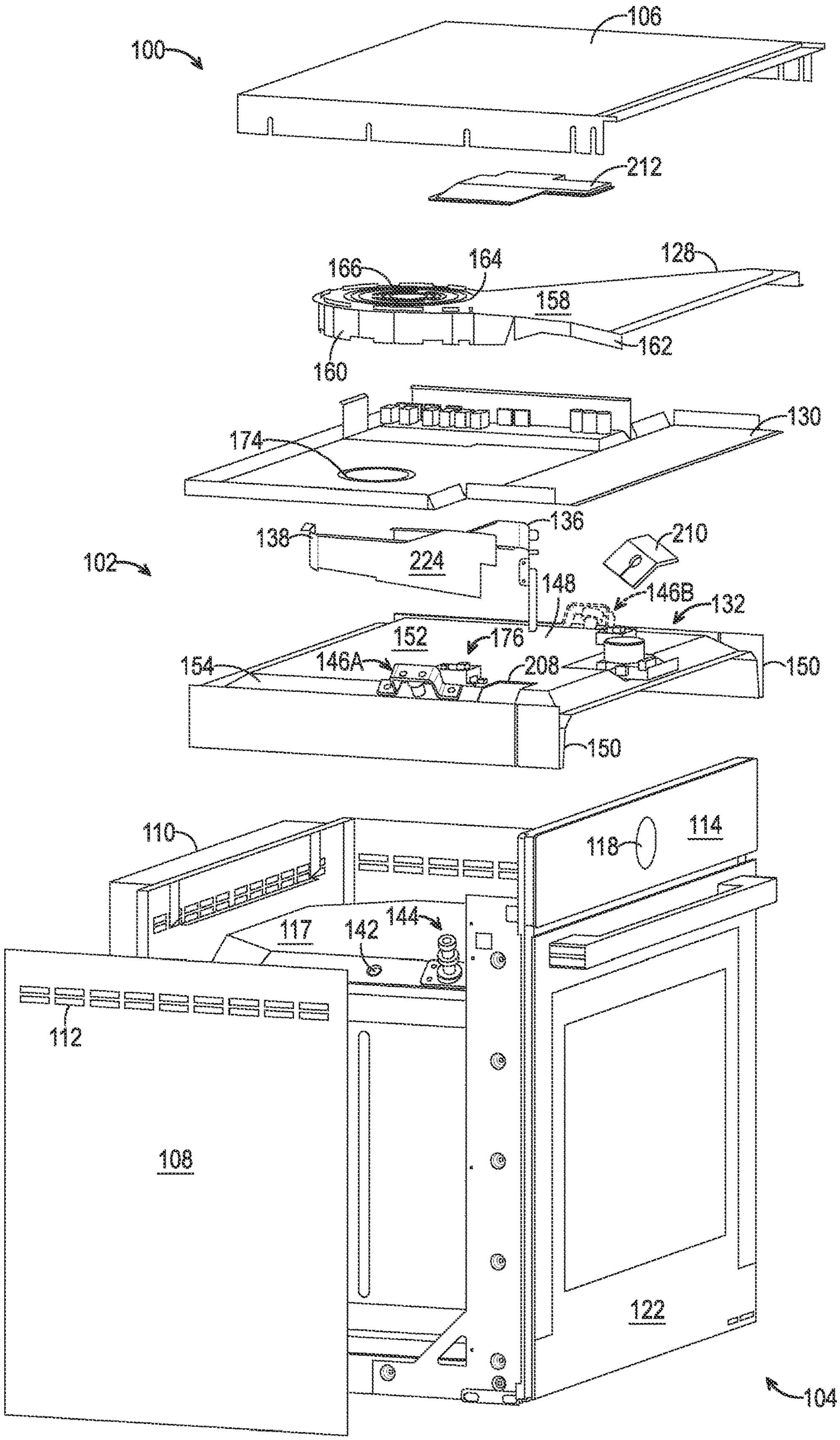
FIG. 6 is an isometric, exploded view of the oven of FIG. 2, depicting illustrative components of the oven and mounted imaging system in accordance with aspects of the present disclosure.

FIG. 6 depicts an exploded view of selected components of oven 100. As shown in FIG. 6, oven 100 further includes an air channel exhaust plate 128, an air conduction plate 130, and an upper insulation retainer 132. These components of oven 100 are arranged such that upper insulation retainer 132 is disposed above cooking cavity 116, air conduction plate 130 is disposed above upper insulation retainer 132, and air channel exhaust plate 128 is disposed above air conduction plate 130. Removable top panel 106 is disposed above air channel exhaust plate 128 to close the oven. In some examples, the oven body may further include a hob disposed above the cooking cavity and air channel exhaust plate 128. In some examples, components of mounted imaging system 102 are mounted to and/or coupled to an outer shell 117 of cooking cavity 116, upper insulation retainer 132, and/or air conduction plate 130.

As shown in FIG. 6, oven 100 further includes a pair of airflow separators 136, 138 disposed between upper insulation retainer 132 and air conduction plate 130, and coupled to the upper insulation retainer and the air conduction plate to form a compartment 134. The pair of airflow separators include an inner airflow separator 136 and outer airflow separator 138 each having a first arm portion extending at an elbow to a second arm portion. The inner and outer airflow separators have a boomerang-shaped or V-shaped or C-shaped cross-section, such that at least four walls of compartment 134 are formed by the separators. In some examples, one or more components of mounted imaging system 102 are mounted to upper insulation retainer 132 within compartment 134.

The outer shell of cooking cavity 116 includes a plurality of fastening apertures, a camera aperture 140, and/or one or more second LED aperture(s) 142. Camera aperture 140 allows a portion of a camera assembly 144 of mounted imaging system 102 to pass into cavity 116 to enable the camera to view and provide an image and/or video of the cavity interior. Similarly, the one or more LED apertures(s) 142 allow a portion of a lighting assembly 146 of mounted imaging system 102 to pass into cooking cavity 116 to enable an LED to illuminate the inside of the cooking cavity. Camera aperture 140 may be disposed adjacent an upper front right corner of cooking cavity 116. In some examples, the one or more second LED aperture(s) 142 are disposed along upper right and/or left sections of the cooking cavity. In some examples, the plurality of fastening apertures are disposed around camera aperture 140 to facilitate the mounting of camera assembly 144 to cooking cavity 116.

Upper insulation retainer 132 includes a main insulation panel 148 coupled to a pair of lateral hook-shaped ventilation troughs 150 configured to extend down past a top portion of the cooking cavity and then back up to couple to a second fastening portion of removable lateral wall 108 disposed under the plurality of cooling vents 112. As depicted in FIG. 6, main insulation panel 148 may have a shape corresponding to the contour of a top portion of the outer shell of cooking cavity 116, such that the main insulation panel generally comprises a flat first central portion 152 transitioning on all sides to an angled second portion 154. Angled second portion 154 disposed on the lateral sides of flat first central portion 152 may be fixedly coupled on outer ends to an inner end of the hook-shaped lateral ventilation troughs 150 to form upper insulation retainer 132.

Air channel exhaust plate 128 is coupled to air conduction plate 130 to form a ducted housing 156 configured to collect warm air present in the internal space of oven 100 and expel the collected air into the surrounding environment. The air channel exhaust plate may include a fan mounting panel 158 having an underside coupled along its periphery to a top end of one or more peripheral walls 160 which are configured to couple on a bottom end with an upper surface of air conduction plate 130 to form ducted housing 156. In some examples, the fan mounting panel 158 may be coupled to one or more peripheral walls 160 and/or may comprise a plurality of downward-extending peripheral portions 162 extending downward from the fan mounting panel and coupled to air conduction plate 130 to form at least a portion of the ducted housing. The fan mounting panel 158 of air channel exhaust plate 128 further includes a fan mounting aperture 164 configured to receive a cooling fan 166 such as a centrifugal fan and/or any other suitable fan or air mover. Cooling fan 166 is configured to create a plurality of airflow pathways within oven 100 to provide ventilation to heat-sensitive components of the oven.

In some examples, the walls of ducted housing 156 includes peripheral wall 160 extending around and partially encircling a back side of cooling fan 166, and a plurality of downward-extending peripheral portions 162 disposed along right and/or left sides of fan mounting panel 158. The plurality of downward peripheral portions 162 may be disposed along the periphery of fan mounting panel 158, such that together they form a wall extending along at least a portion of the periphery of fan mounting panel 158. In some examples, at least one or more of the downward peripheral portions are arranged such that they create a wall extending between a respective end of peripheral wall 160 and a back side of the upper front surface of oven base 110 adjacent peripheral vents of the plurality of exhaust vents 126. Air channel exhaust plate 128 is coupled to a back side of oven base 110 above exhaust vents 126, and air conduction plate 130 is coupled to the back side of oven base 110 below the plurality of exhaust vents, such that an exhaust opening of ducted housing 156 is disposed adjacent the plurality of exhaust vents 126.

Figure 7:
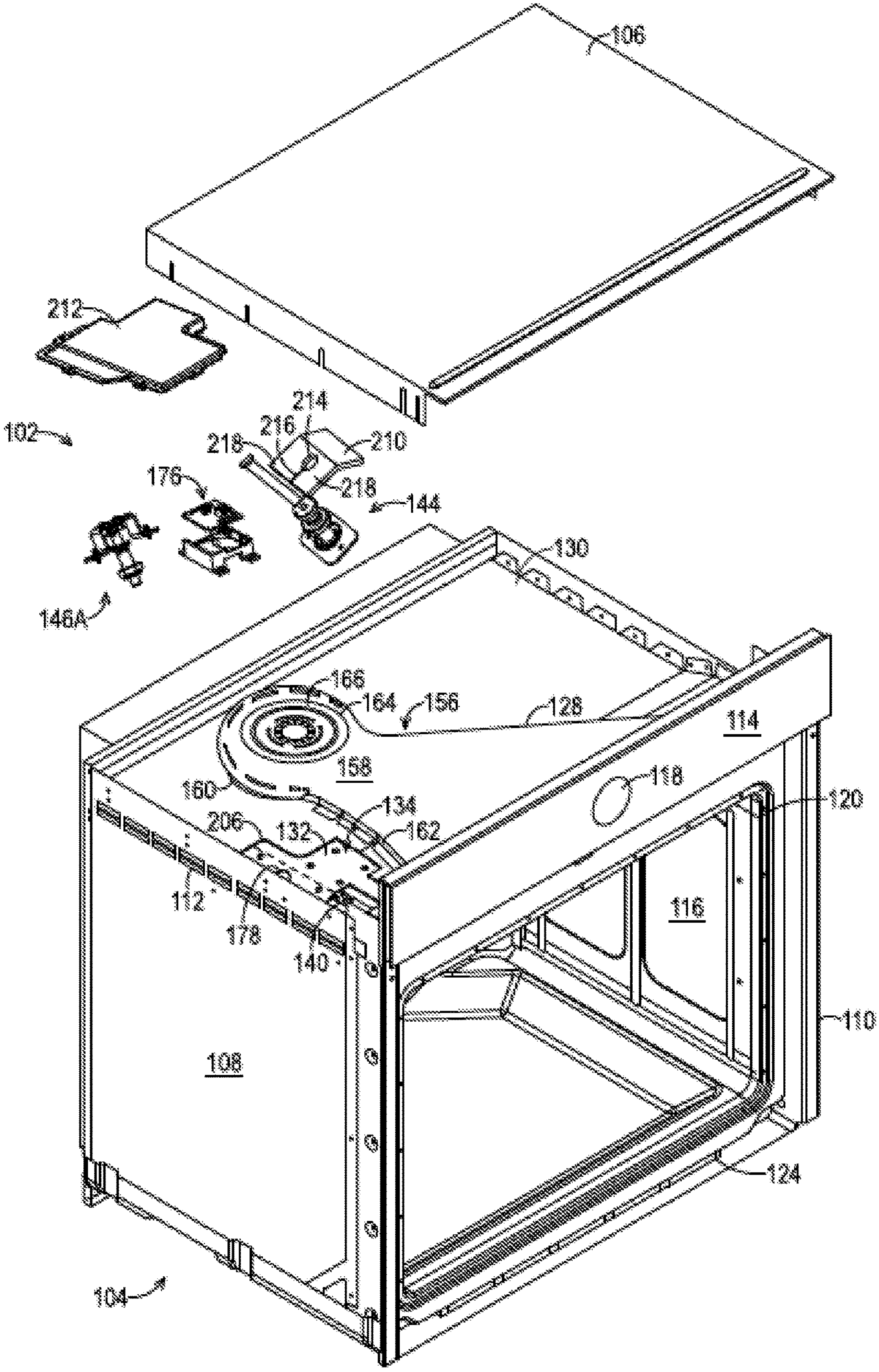
FIG. 7 is an isometric view of the oven of FIG. 1 with a top panel removed and components of the mounted imaging system dismounted from the oven.

Air conduction plate 130 further includes a fan air inlet 174 extending through a surface of the air conduction plate opposite fan mounting aperture 164. The fan air inlet is configured to allow warm air accumulated between the air conduction plate and upper insulation retainer 132 to be pulled up into ducted housing 156 by cooling fan 166. As depicted in FIGS. 6 and 7, ducted housing 156 may extend from an upper central portion of oven 100, where cooling fan 166 is mounted, to the plurality of exhaust vents 126 disposed in a front upper surface of oven base 110, to form an exhaust airflow pathway. The exhaust airflow pathway includes the warm air accumulated between air conduction plate 130 and upper insulation retainer 132 being pulled up into ducted housing 156, traveling through the ducted housing, and being expelled into the surrounding environment via the plurality of exhaust vents 126. As such, ducted housing 156 by way of cooling fan 166 and fan air inlet 174 is configured to receive warm air pulled up through the fan air inlet and direct the received air toward the plurality of exhaust vents 126 where the warm air is expelled into the surrounding environment.

FIG. 7 depicts a partially assembled oven 100 with top panel 106 and one or more removable service covers removed and the components of mounted imaging system 102 spaced from the oven. As seen in FIG. 7, compartment 134 may comprise an internal space disposed adjacent an upper right front corner of oven 100 above the cooking cavity and defined between an upper surface of upper insulation retainer 132, a lower surface of air conduction plate 130, and the pair of airflow separators 136, 138. Compartment 134 by way of upper insulation retainer 132, air conduction plate 130, and inner and outer airflow separators 136, 138, is configured to at least partially surround and facilitate improved ventilation and cooling of heat-sensitive components of mounted imaging system 102. Mounted imaging system 102 may include camera assembly 144, one or more lighting assemblies 146, and/or a mounted imaging computer 176.

Upper insulation retainer 132 may further include one or more first LED aperture(s) 178 and/or a plurality of apertures configured to allow components of mounted imaging system 102 to be fastened to the upper insulation retainer at selected positions and orientations. In the example depicted in FIGS. 6 and 7, a portion of upper insulation retainer 132 which forms a bottom side of compartment 134 may include a first LED aperture 178 and a plurality of fastening apertures configured to allow components of mounted imaging system 102 to be attached at selected positions and orientations. First LED aperture 178 is configured to receive a portion of lighting assembly 146A of the mounted imaging system. FIGS. 8-9 and 11-12 depict illustrative components of the mounted imaging system.

Figure 8:
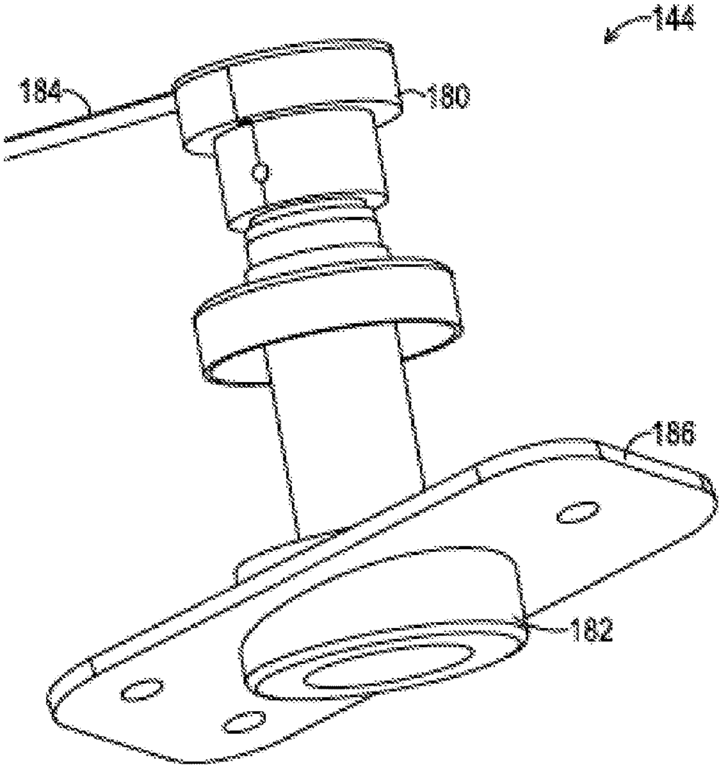
FIG. 8 is an isometric view of an illustrative imaging device camera assembly of the mounted imagining system in accordance with aspects of the present disclosure.

FIG. 8 depicts example camera assembly 144 including a camera body 180 (AKA an electronics portion) coupled to a lens housing 182 (AKA a lens portion) having one or more lenses, a flexible printed circuit cable (AKA FPC cable) 184, and a welded camera mounting plate 186. The welded camera mounting plate may be welded to lens housing 182 at an angle to provide the camera with a specified view of the interior of cooking cavity 116. In some examples, welded camera mounting plate 186 is configured to be coupled to the outer shell of cooking cavity 116 around camera aperture 140 to secure lens housing 182 to the cooking cavity at an angle. Camera aperture 140 may be configured to snugly receive and hold at least a portion of lens housing 182. Welded camera mounting plate 186 may include a plurality of apertures (e.g., 3) that correspond to fastening apertures disposed in a specified location on the outer shell of cooking cavity 116.

Figure 9:
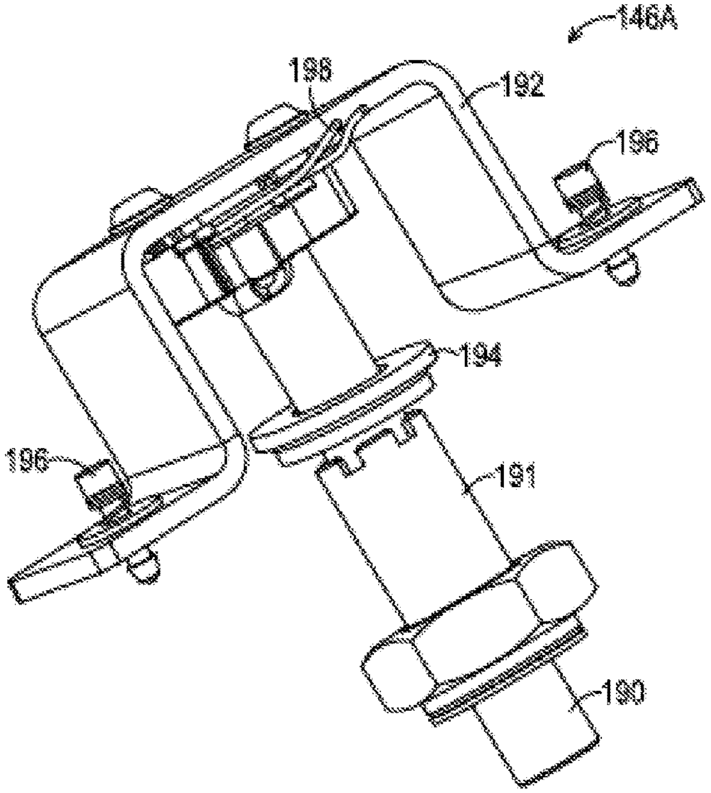
FIG. 9 is an isometric view of an illustrative LED assembly of the mounted imagining system in accordance with aspects of the present disclosure.

FIG. 9 depicts a lighting assembly 146A, which is an example of the one or more lighting assemblies 146. Lighting assembly 146A includes an LED 188, an LED barrel (AKA LED housing) 190, an LED mounting bracket 192, a silicone seal 194, a pair of push fasteners 196, and a plurality of cables 198. LED 188 is disposed in LED housing 190 which is coupled on a top end to LED mounting bracket 192. LED mounting bracket 192 is configured to securely fasten LED housing 190 to upper insulation retainer at a specified location. LED mounting bracket 192 may further be configured to act as a heat sink to better cool heat-sensitive components of lighting assembly 146A. Silicone seal 194 is disposed around a central portion of LED housing 190 and is configured to seal off first LED aperture 178 disposed in the upper insulation retainer when the LED housing is at least partially inserted through the first LED aperture, such that the silicone seal is at least partially disposed within first LED aperture 178.

Figure 10:
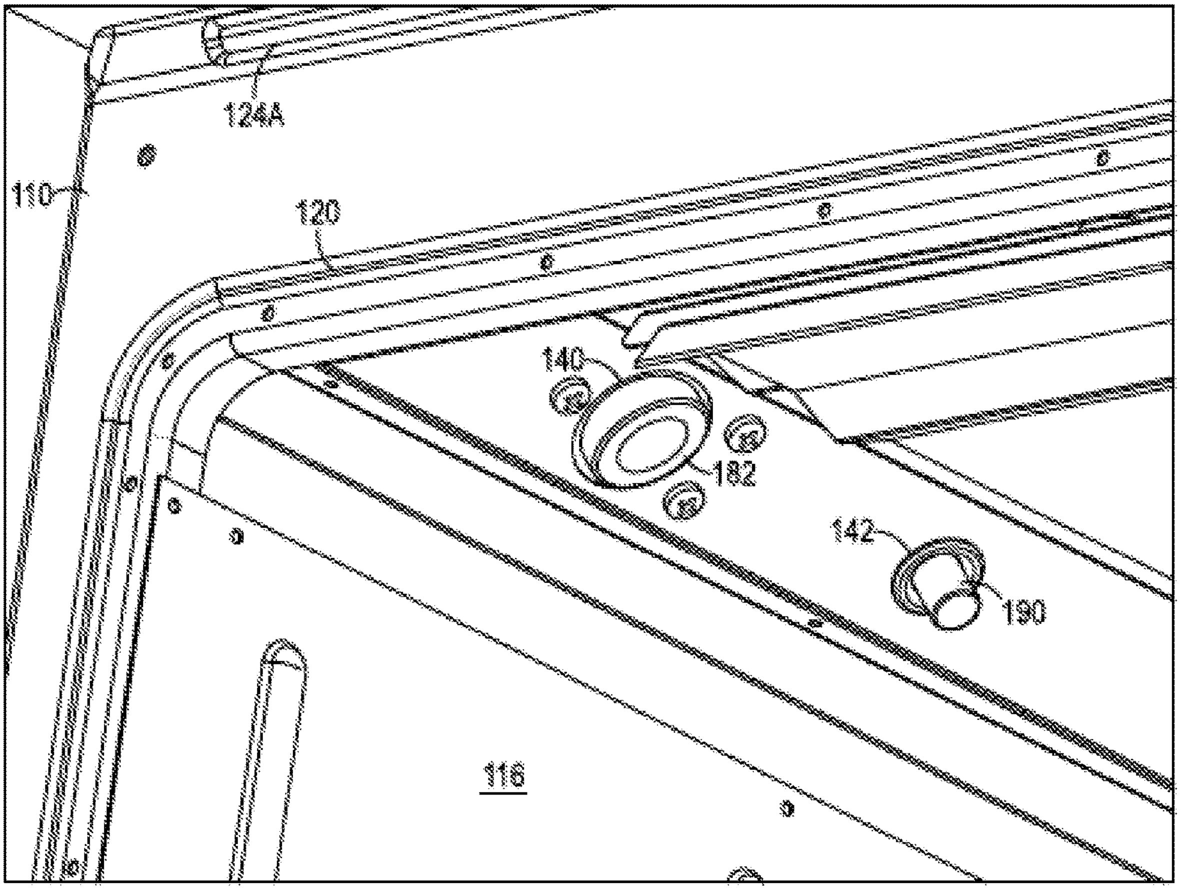
FIG. 10 is an isometric view of an interior of the oven, depicting the camera assembly and LED assembly mounted adjacent a right front corner of an cooking cavity in accordance with aspects of the present disclosure.

FIG. 10 is a partial interior view of an upper right front corner of cooking cavity 116 and depicts lens housing 182 of the camera assembly 144 disposed in camera aperture 140, and an end of LED housing 190 disposed in second LED aperture 142A. Camera aperture 140 is configured to allow a portion of camera assembly 144 of mounted imaging system 102 to pass from an exterior side of cooking cavity 116 to an interior side of the cavity to enable the camera to view and provide an image and/or video of the cavity interior. Similarly, the one or more second LED apertures(s) 142 are configured to allow a portion of lighting assembly 146A of mounted imaging system 102 to pass from an exterior side of cooking cavity 116 to an interior side of the cavity to enable the LED of the lighting assembly to illuminate the inside of the cooking cavity. In some examples, the upper right front corner on cooking cavity 116 further includes the fastening apertures that correspond to the plurality of apertures on welded camera mounting plate 186. Welded camera mounting plate 186 may be coupled to the cooking cavity by inserting a screw or other fastener into a fastening aperture of cooking cavity 116 and an aperture of welded camera mounting plate 186 from inside the cooking cavity, and tightening. In some examples, the screw or other fastener may first be inserted into an aperture of the welded camera mounting plate, then inserted into a corresponding fastening aperture in the cooking cavity and tightened.

Figure 11:
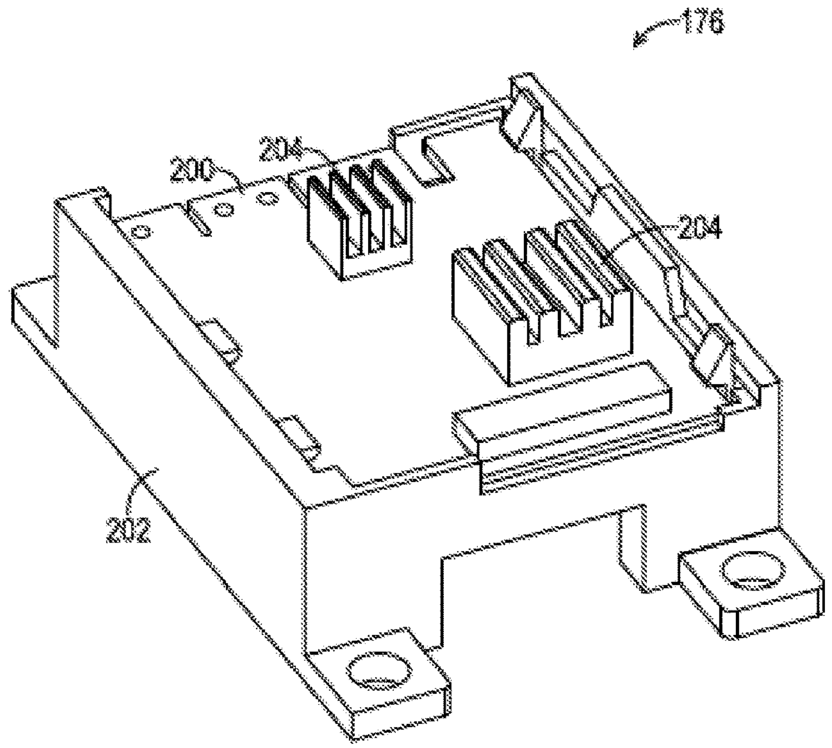
FIG. 11 is an isometric top view of an illustrative mounted imagine computer of the mounted imagining system in accordance with aspects of the present disclosure.
Figure 12:
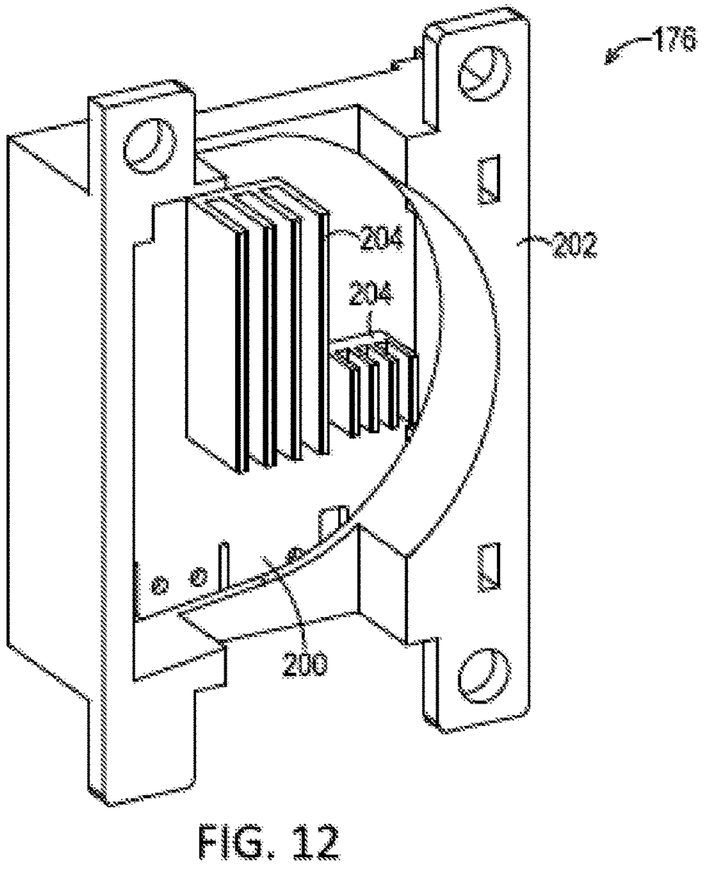
FIG. 12 is an isometric bottom view of the illustrative mounted imagine computer of FIG. 11.

FIGS. 11 and 12 depict a top and bottom of a mounted imaging computer 176 of the mounted imaging system 102. Mounted imaging computer 176 includes a trusted computer base (TCB) 200 and a TCB mounting bracket 202 configured to securely receive TCB 200 and couple the TCB to upper insulation retainer 132 at a specified location. TCB 200 may include a plurality of heat sinks 204 disposed on a top and/or bottom surface, the plurality of heat sinks 204 are configured to dissipate heat away from the TCB in response to interacting with cool air. TCB 200 may be connected to camera assembly 144 by way of FPC cable 184 and/or connected to lighting assembly 146 by way of the plurality of cables 198. In some examples, TCB 200 may be connected to the camera assembly and/or the lighting assembly using any suitable cable, wire, and/or other connector.

As depicted in FIGS. 7 and 13-18, compartment 134 may include two service openings configured to be covered and/or sealed by the one or more removable service covers. In some examples, the two service openings of the compartment include a first service opening 206 formed in air conduction plate 130 and a second service opening 208 formed in upper insulation retainer 132. First service opening 206 may be disposed in a portion of air conduction plate 130 which defines a top side of compartment 134, and configured to allow a user easy access to components of mounted imaging system 102 disposed in the compartment beneath the air conduction plate. For example, air conduction plate 130 may include first service opening 206 disposed through a front right side portion, and one or more apertures configured to receive one or more fasteners. First service opening 206 may have a size and shape configured to allow easy access and servicing to components of mounted imaging system 102 disposed beneath the air conduction plate.

Second service opening 208 may be disposed in a portion of upper insulation retainer 132 which defines a bottom side of compartment 134. The second service opening is configured to allow a user easy access to components of mounted imaging system 102 disposed beneath upper insulation retainer 132 and/or coupled to outer shell 117 of cooking cavity 116 to enable easy installation and/or servicing. Second service opening 208 may have a size and shape configured to facilitate easy installation or removal of camera assembly 144 and/or servicing of the one or more components of the camera assembly.

Figure 13:
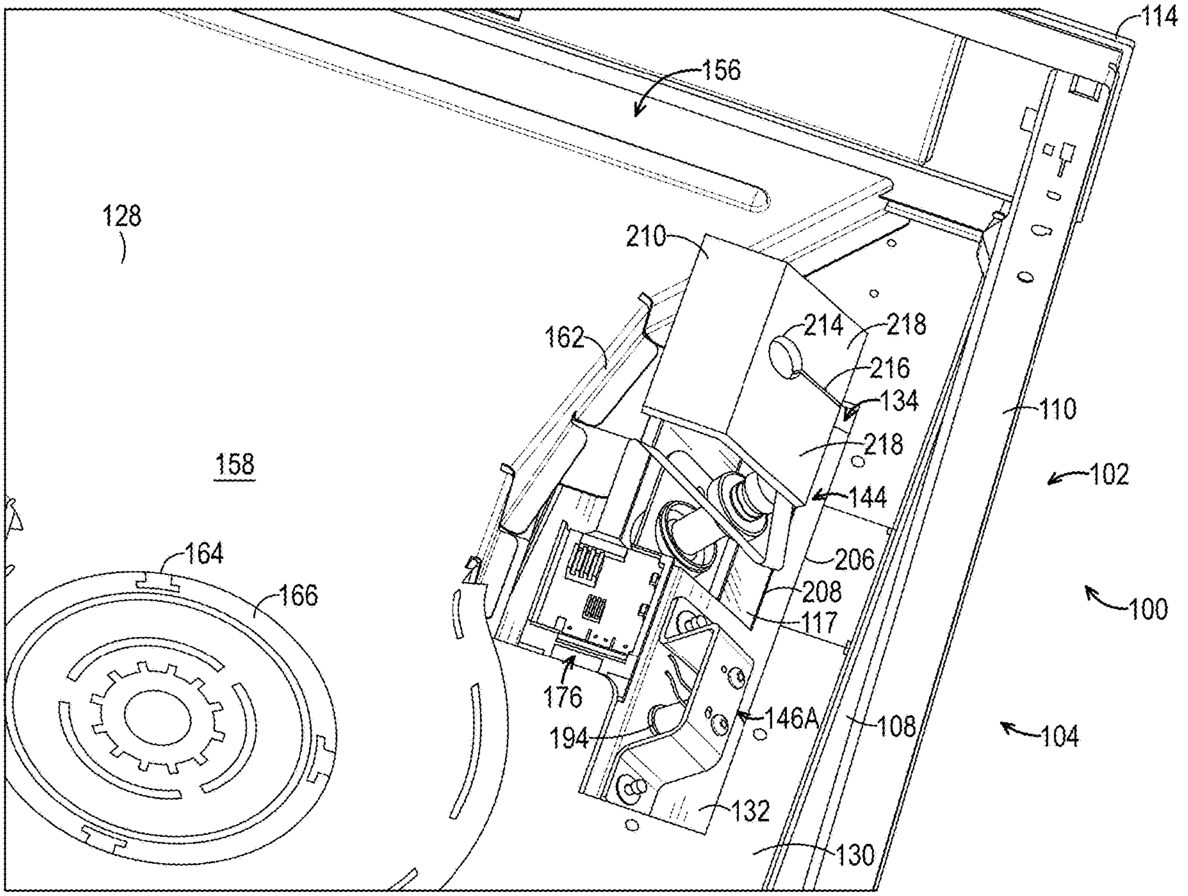
FIG. 13 is an isometric top view of the oven of FIG. 1 with all removable covers removed.
Figure 14:
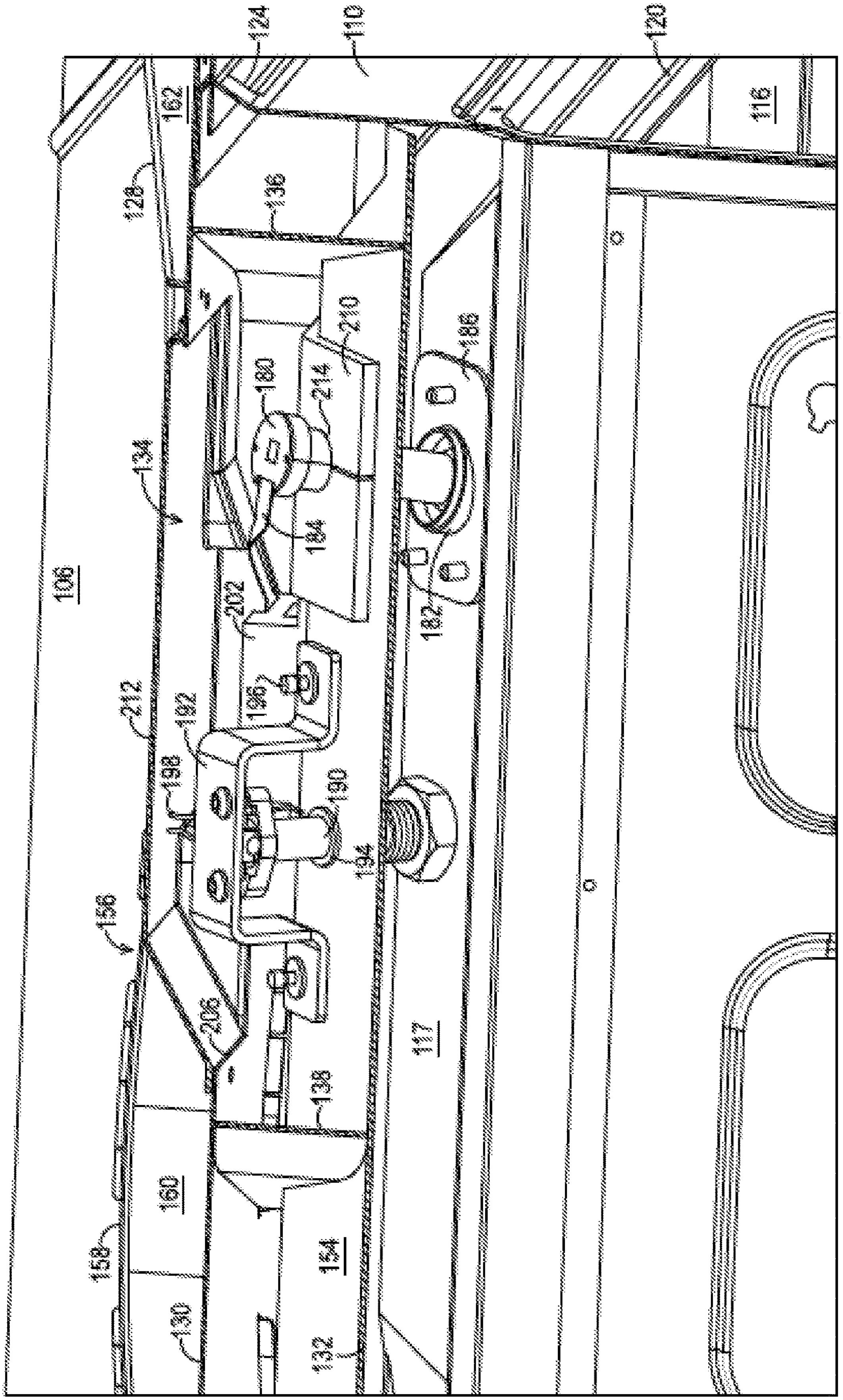
FIG. 14 is a sectional view of the oven of FIG. 2 along plane 14, depicting the illustrative mounted imaging system arranged in the oven in accordance with aspects of the present disclosure

In some examples, the one or more removable service covers configured to cover and/or seal-off the first and second service openings 206, 208 of oven 100 include an inner removable service cover 210 and an outer removable service cover 212. As depicted in FIGS. 13 and 14, inner removable service cover 210 is configured to be coupled to upper insulation retainer 132 over second service opening 208 to provide heat protection to the components of mounted imaging system 102 accessible through first service opening 206. Inner removable service cover 210 may have a shape corresponding to the shape of second service opening 208 and the contour of upper insulation retainer 132. In some examples, inner removable service cover 210 may also have a size slightly larger than the second service opening. In some examples, the inner removable service cover is a resilient cover and may comprise a flexible and/or resilient, heat-resistant material such as silicone and/or any other suitable material.

FIG. 14 is a cross-sectional view taken along line 14 in FIG. 1 and depicts components of mounted imaging system 102 disposed in compartment 134 and/or mounted to oven 100. As shown in FIG. 14, lighting assembly 146A and camera assembly 144 may both have a top section disposed in compartment 134, and a bottom section disposed in an aperture of cooking cavity 116.

As depicted in FIGS. 13 and 14 inner removable service cover 210 may include a camera mounting aperture 214 centrally disposed through a top surface of the inner removable service cover and a slit 216 extending from a periphery of camera mounting aperture 214 to an outer edge of the inner removable service cover. Slit 216 in inner removable service cover 210 form a pair of inward-facing flexible flaps 218 configured to allow insertion of a portion of camera assembly 144 of mounted imaging system 102 into camera mounting aperture 214. In some examples, the pair of inward-facing flexible flaps 218 are resilient features configured to easily bend and reform around the portion of camera assembly 144 pushed through slit 216 and into camera mounting aperture 214. Camera mounting aperture 214 is configured receive and hold the portion of camera assembly 144 such that the electronics portion 180 of the camera assembly may be disposed above inner removable service cover 210 and thus be disposed in compartment 134. As such, inner removable service cover 210 by way of camera mounting aperture 214 is configured to allow camera assembly 144 to have electronics portion 180 disposed above an upper surface of the inner removable service cover to receive the cooling benefits of compartment 134 while having lens housing 182 disposed outside of the compartment. FIG. 14 further depicts the compartment spaced from a ceiling of the insulated cooking cavity, such that the imaging device extends into the insulated cooking cavity from inside the compartment through a space below the compartment.

In some examples, inner removable service cover 210 further includes one or more flexible protrusion(s) disposed on a bottom surface and configured to interface with inner edges of second service opening 208 to secure the inner removable service cover over the second service opening.

Figure 15:
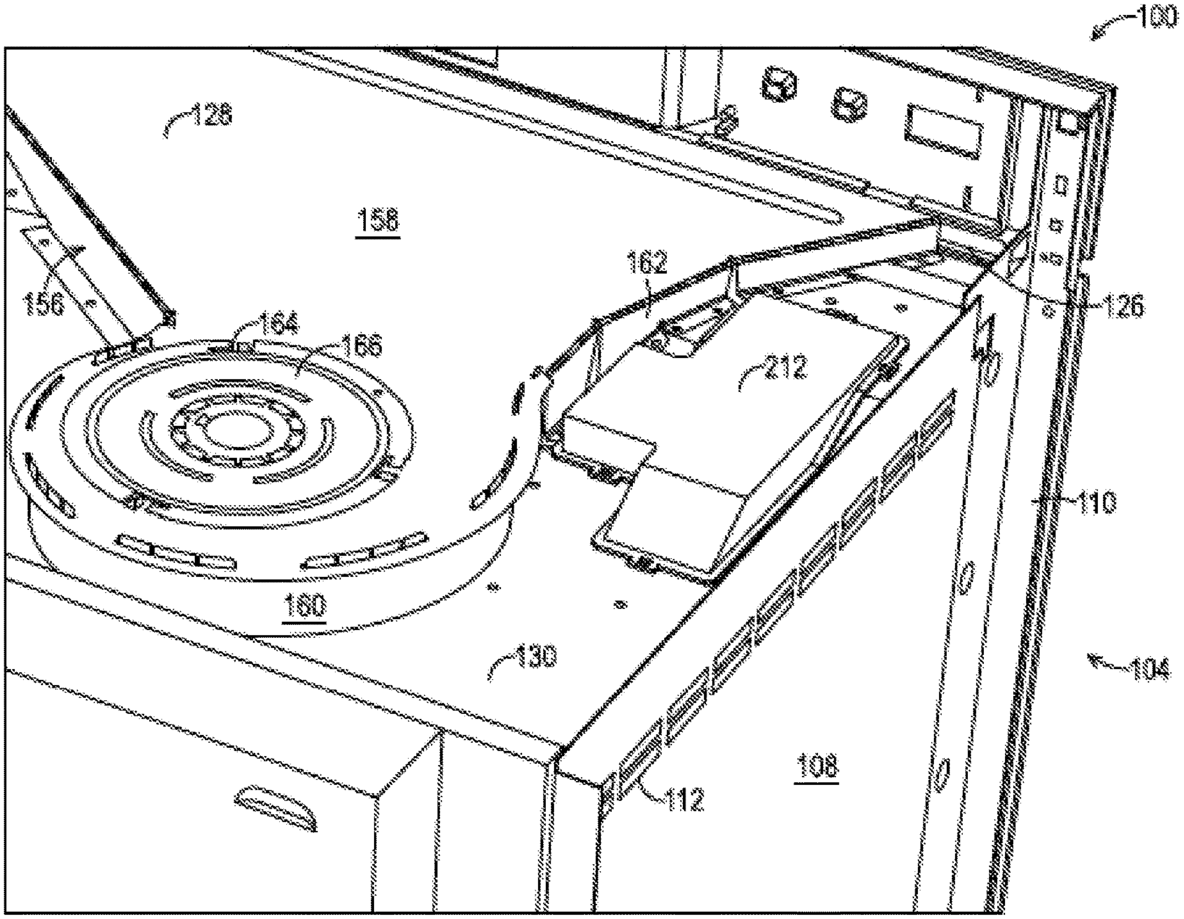
FIG. 15 is an isometric back top view of the oven of FIG. 1 with the top panel removed.

As depicted in the example of FIGS. 14 and 15, outer removable service cover 212 is configured to be fastened to air conduction plate 130 over first service opening 206 to provide protection to the components of mounted imaging system 102 accessible through the first service opening. Outer removable service cover 212 may have a shape corresponding to the shape of first service opening 206 and/or any other shape that suitably seals-off the first service opening. In some examples, the outer removable service cover is configured to be slightly larger than the size of the first service opening.

Figure 16:
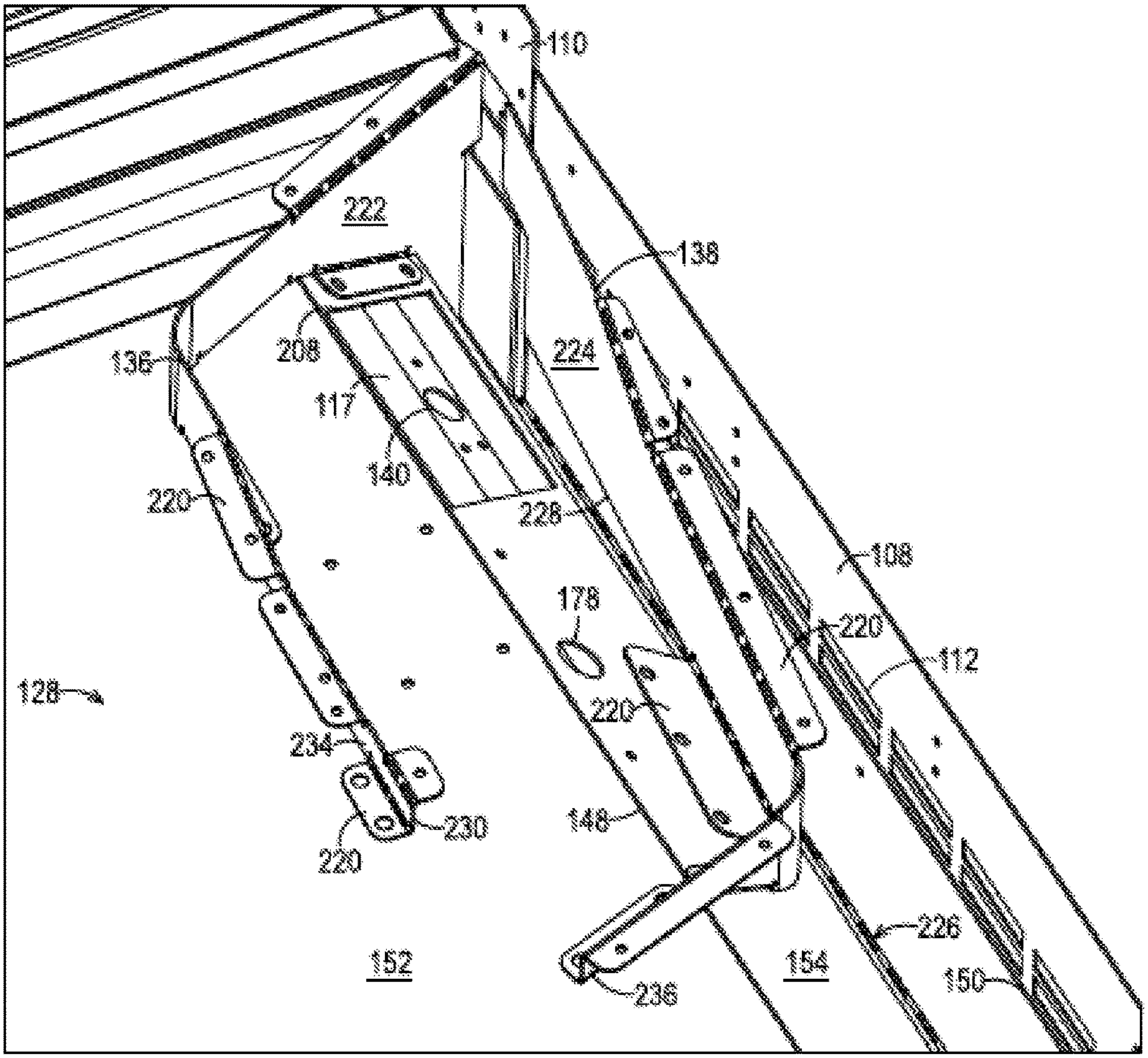
FIG. 16 is an isometric top view of the oven with all removable covers, an air exhaust plate, an air conduction plate, and components of the mounted imaging system removed, depicting an illustrative pair of airflow separators arranged on an exposed upper insulation retainer component of the oven in accordance with aspects of the present disclosure.

FIG. 16 is a partial top view of oven 100 in a partially assembled state with the top panel 106, air channel exhaust plate 128, air conduction plate 130, inner service cover 210, outer service cover 212, and components of mounted imaging system 102 removed from the oven. Specifically, FIG. 16 depicts an arrangement of inner airflow separator 136 and outer airflow separator 138 coupled to upper insulation retainer 132 and/or oven base 110. In some examples, inner airflow separator 136 and outer airflow separator 138 both comprise a plurality of peripheral fastening flanges 220 configured to either couple to the upper insulation retainer and/or to air conduction plate 130 at specified locations. As depicted in the example of FIG. 16, inner airflow separator 136 and outer airflow separator 138 may be configured to couple to the changing contours of upper insulation retainer 132 and air conduction plate 130. As such the inner and outer airflow separators 136, 138 may have a shape corresponding to the contour of a section of air conduction plate 130 and/or upper insulation retainer 132 that they are respectively configured to be coupled to.

For example, inner airflow separator 136 may comprise a first arm portion 222 having a shape configured to extend along a portion of the main insulation panel and into a right lateral ventilation trough 150A of upper insulation retainer 132 to redirect all cool air flowing on the ventilation trough into compartment 134. In some examples, outer airflow separator 138 may comprise a first arm portion 224 having a shape configured to extend along a portion of a lateral angled second portion 154 of main insulation panel 148 and then over a ventilation channel 226 formed by the lateral ventilation trough 150, to couple to an inner back side of the upper front portion of oven base 110. Ventilation channel 226 having a bottom section and a top section.

A segment of outer airflow separator 138 first arm portion 224 which extends over ventilation channel 226 may further extend partially downwards into the bottom section of the ventilation channel to form a compartment air inlet 228 configured to bring cool air into compartment 134. Cavity air inlet 228 may be disposed in a front right underside of compartment 134 and/or in any other suitable location. In some examples, the structure formed by first arm portion 224 of outer airflow separator 138 and right lateral ventilation trough 150A is configured to separate incoming cool air from the accumulated warm air such that only cool and/or cold air is used to cool components of mounted imaging system 102 disposed in compartment 134. This arrangement of the pair of airflow separators and compartment air inlet 228 may separate warm air and cold air based on the principle that cooler and/or cold air is denser than warm air and thus would sink into the bottom section of ventilation trough 150A while the warm air would remain in or above the top section of the ventilation trough. As such, outer airflow separator's first arm portion 224 which extends from the lateral angled second portion 154 over ventilation channel 226 and down into the bottom portion of the ventilation channel, is configured to block warm air and allow only the coldest of provided air to be used to ventilate compartment 134.

Figure 17:
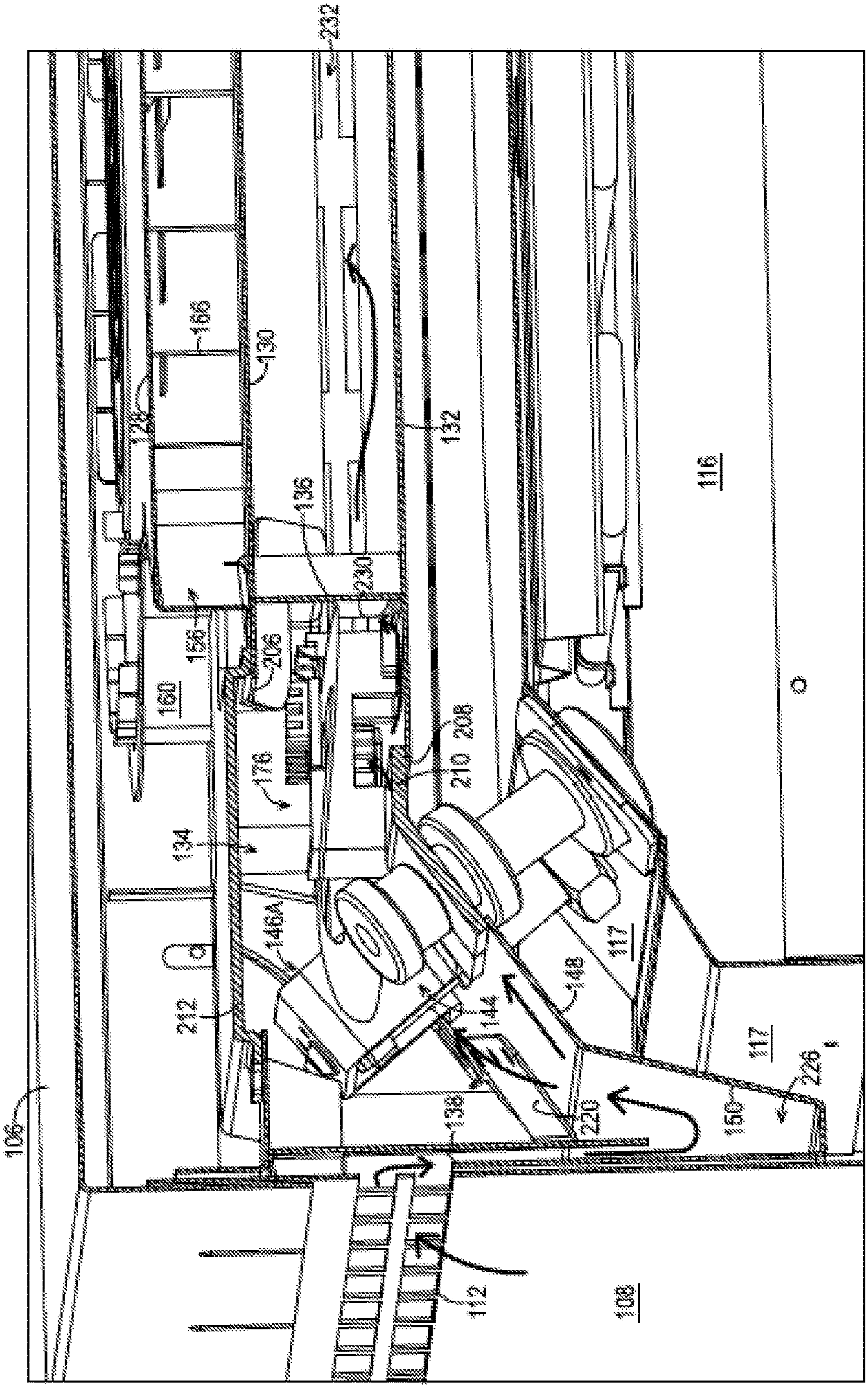
FIG. 17 is a sectional view of the oven of FIG. 2 along plane 17, depicting an illustrative compartment airflow pathway directed through a compartment of the oven in accordance with aspects of the present disclosure.
Figure 18:
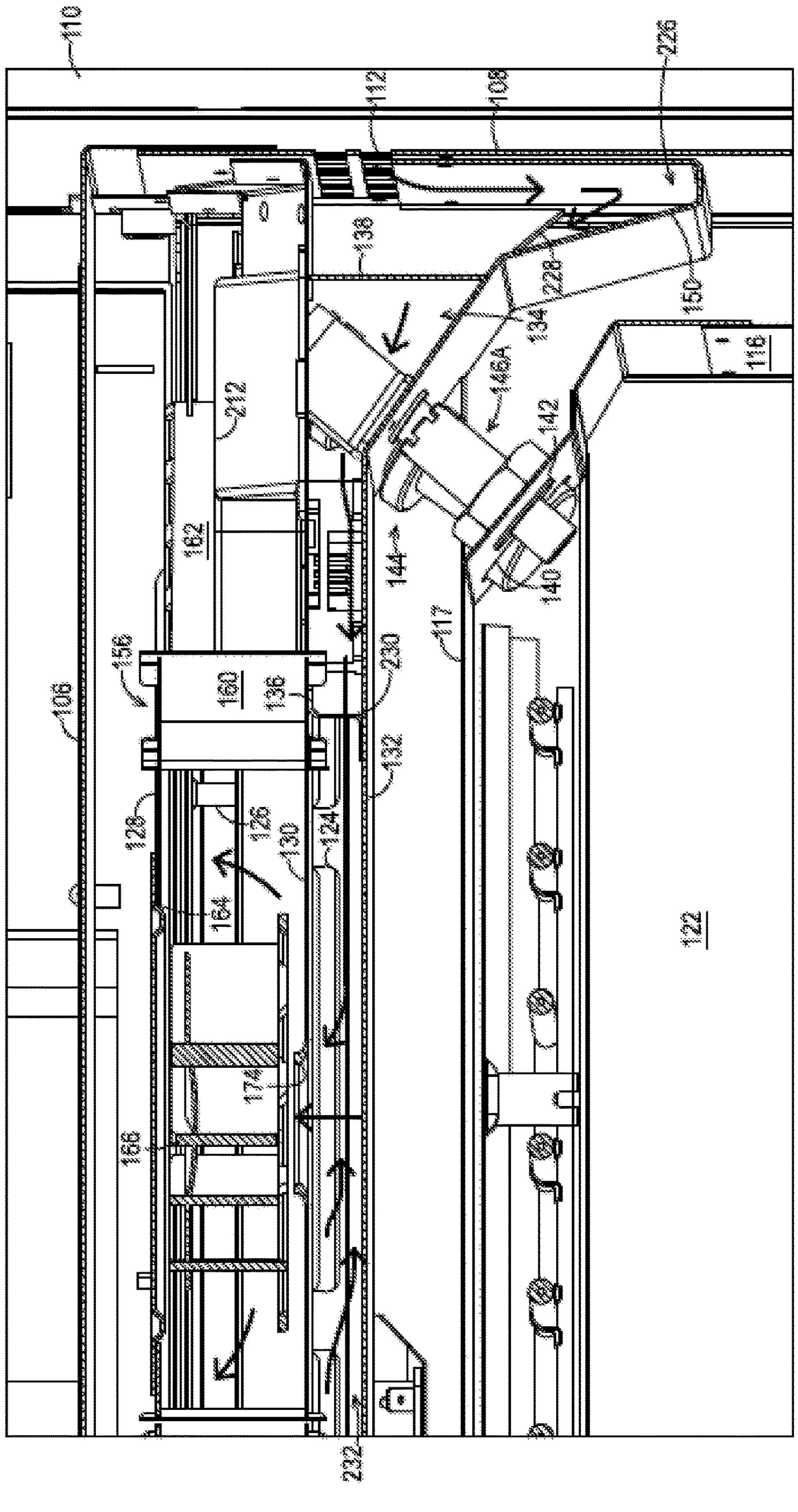
FIG. 18 is a sectional view of the oven of FIG. 2 along plane 18, depicting the illustrative compartment airflow pathway directed through the compartment of the oven in accordance with aspects of the present disclosure.

As depicted in the cross-sectional views of FIGS. 17 and 18, this arrangement of the pair of airflow separators 136, 138 generates a secondary airflow pathway (AKA compartment airflow pathway) of cold and/or cool air which passes through compartment air inlet 228 and into compartment 134 to cool components of mounted imaging system 102 disposed within the compartment. FIGS. 17-18 are cross-sectional views along the sectional view lines 17 and 18 in FIG. 3 and depict portions of compartment 134 and one or more airflow pathways formed in oven 100. As depicted FIGS. 16-18, the pair of airflow separators 136, 138 are disposed between and coupled to air conduction plate 130 and/or upper insulation retainer 132 such that an elbow of outer airflow separator 138 defines a back right corner of compartment 134 and an elbow of inner airflow separator 136 defines a front left corner of the compartment.

Compartment 134 may further include a compartment air outlet 230 configured to allow passage of air out of the compartment and into a main airflow channel 232 formed between air conduction plate 130 and upper insulation retainer 132. As depicted in FIGS. 16-18, compartment air outlet 230 may be disposed in a back right corner of compartment 134 and/or in any other suitable location. In some examples, compartment air outlet 230 is formed in a gap between distal ends of second arms 234, 236 of the inner and outer airflow separators 136, 138, air conduction plate 130, and upper insulation retainer 132. By way of compartment air outlet 230 and main airflow channel 232, the compartment airflow pathway and the primary airflow pathway converge into a single airflow pathway which may then be pulled up into ducted housing 156 and expelled into the surround environment.

As depicted in FIGS. 17 and 18, oven 100 includes a plurality of airflow pathways that converge into a single exhaust pathway. In some examples, the plurality of airflow pathways includes a main airflow pathway that is circulated throughout the oven and the compartment airflow pathway which is configured to provided targeted cooling to components of mounted imaging system 102 disposed within compartment 134. In some examples, compartment 134 is in fluid communication with fan air inlet 174 and cooling vents 112 to produce an airflow pathway extending from cooling vents 112 through the compartment and to the plurality of exhaust vents 126 In some examples, the main airflow pathway may pull air in from cooling vents 112 and/or the one or more sets of air intake vents 124 and circulate it throughout the oven before converging into the main airflow channel 232 formed between air conduction plate 130 and air channel exhaust plate 128 adjacent the fan air inlet 174. Due to the difference in density of air pulled in from cooling vents 112 vs. the warm air already present inside oven 100, the cooler and/or cold air pulled in from the cooling vents may sink into lateral ventilation troughs 150 where it may then be pulled under a section of first arm portion 224 of outer airflow separator 138 and into compartment 134 by way of compartment air inlet 228. Once inside compartment 134, compartment airflow pathway circulates the cold air throughout the compartment to cool the components of mounted imaging system 102 disposed within the compartment. Air circulating within compartment 134 is then expelled into main airflow channel 232 by way of compartment air outlet 230.

In main airflow channel 232, the compartment airflow pathway and main airflow pathway converge into a single intake pathway. Warm air flowing on the intake pathway is then pulled up into ducted housing 156 by cooling fan 166 and begins flowing on the exhaust airflow pathway. The exhaust airflow pathway configured to collect air pulled up into ducted housing 156, direct the collected air through the ducted housing, and expel the collected air into the surrounding environment by way of the plurality of exhaust vents 126.

B. Illustrative Method

Figure 19:
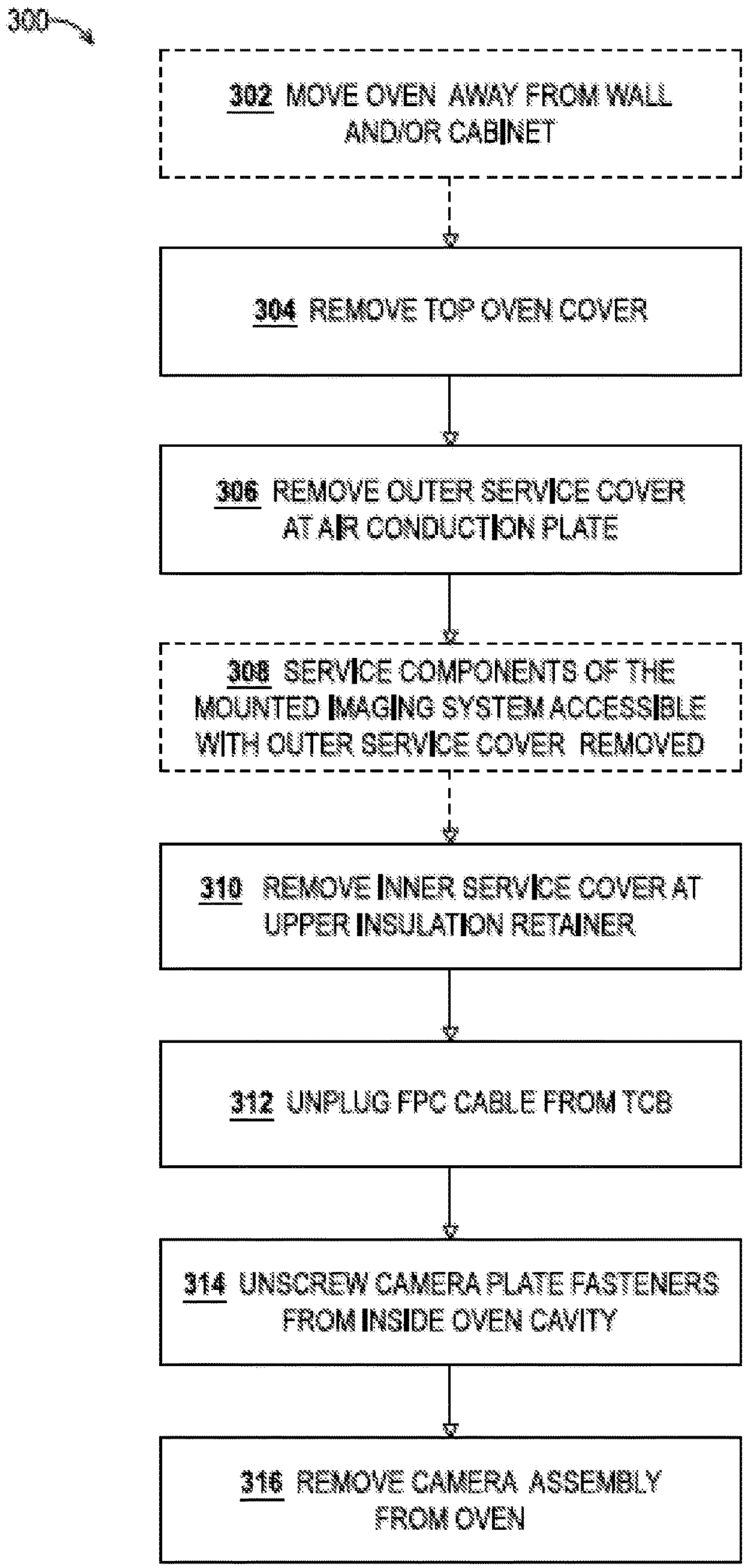
FIG. 19 is a flow chart depicting step of an illustrative method for accessing and servicing components of the mounted imaging system according to aspects of the present disclosure.

This section describes steps of an illustrative method 300 for accessing an compartment in which components of a mounted imaging system are disposed; see FIG. 19. Aspects of an oven with a serviceable mounted imaging system may be utilized in the method steps described below. Where appropriate, reference may be made to components and systems that may be used in carrying out each step. These references are for illustration, and are not intended to limit the possible ways of carrying out any particular step of the method.

FIG. 19 is a flowchart illustrating steps performed in an illustrative method, and may not recite the complete process or all steps of the method. Although various steps of method 300 are described below and depicted in FIG. 19, the steps need not necessarily all be performed, and in some cases may be performed simultaneously or in a different order than the order shown.

Step 302 of method 300 is optional and includes pulling and/or pivoting the oven and/or appliance at least partially out of a cabinet and/or wall that the oven is installed in. In examples where the oven is not mounted or installed in a cabinet and/or wall such that a top of the oven is accessible, this step may be skipped.

Step 304 of method 300 includes detaching and/or removing a removable top panel from an oven body. The removable top panel is configured to detachably couple to upper portions of an oven base and/or removable lateral walls of the oven body at one or more fastening locations.

Step 306 of method 300 includes detaching and/or removing an outer removable service cover from an air conduction plate to which the outer service cover is coupled. The outer removable service cover is configured to be fastened to the air conduction plate over a first service opening that provides access into a compartment formed under the air conduction plate. In some examples, this step includes removing a plurality of fasteners coupling the outer service cover to the air conduction plate and lifting the outer removable service cover out of the oven.

Step 308 of method 300 is optional and includes servicing components of the mounted imaging system disposed in the compartment and accessible through the first service opening. Components of the mounted imaging system disposed in the compartment may include a mounted imaging computer, a top portion of a lighting assembly, and/or a top portion of a camera assembly.

Step 310 of method 300 includes detaching and/or removing an inner removable service cover from an upper insulation retainer to which the inner service cover is coupled. The inner removable service cover configured to be fastened to the upper insulation retainer over a second service opening. One or more parts of the camera assemble are disposed under the compartment and accessible through the second service opening.

Step 312 of method 300 includes unplugging an FPC cable of the camera assembly from the TCB of the mounted imaging system.

Step 314 of method 300 includes unscrewing a plurality (e.g., 3) of fasteners from the inside of the cooking cavity to detach the camera mounting plate from the outer shell of the cooking cavity. In some examples, the plurality of fasteners may be unscrewed from outside the cooking cavity by way of the second service opening.

Step 316 of method 300 includes removing the camera assembly from the oven. This step may include pulling the entire camera assembly including the camera mounting plate out of the oven through the first and second service openings.

C. Illustrative Combinations and Additional Examples

This section describes additional aspects and features of an oven with a serviceable mounted imaging system, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A cooking appliance comprising:

an insulated cooking cavity having an opening selectively closed by an access door on a front side of the cooking appliance;

an air mover disposed inside the cooking appliance above the insulated cooking cavity, the air mover configured to force air through one or more exhaust ports of the cooking appliance;

an imaging device mounted in a compartment above the insulated cooking cavity and extending into the insulated cooking cavity, such that an interior of the insulated cooking cavity is viewable by the imaging device; and a first air intake disposed in a lateral wall of the cooking appliance, the first air intake configured to receive air into the cooking appliance from a space external to the cooking appliance;

wherein the compartment is in fluid communication with an inlet of the air mover and with the first air intake, such that an airflow pathway extends from the first air intake through the compartment to the one or more exhaust ports.

A1. The cooking appliance of A0, wherein the air mover comprises a centrifugal fan.

A2. The cooking appliance of A0 or A1, wherein the one or more exhaust ports are disposed adjacent a top edge of the opening.

A3. The cooking apparatus of any one of paragraphs A0 through A2, wherein the compartment is disposed above a front corner of the cooking cavity.

A4. The cooking apparatus of any one of paragraphs A0 through A3, wherein the first air intake is disposed in a top half of the lateral wall.

A5. The cooking apparatus of any one of paragraphs A0 through A4, wherein a second air intake is disposed below a bottom edge of the access door.

A6. The cooking appliance of any one of paragraphs A0 through A5, further comprising a hob disposed above the cooking cavity and the air mover.

A7. The cooking appliance of any one of paragraphs A0 through A6, further comprising a top panel installed above the air mover and the compartment, wherein the appliance is configured to provide access to the imaging device through a top of the appliance by removing the top panel and one or more service covers of the compartment.

A8. The cooking appliance of any one of paragraphs A0 through A7, wherein the compartment is spaced from a ceiling of the insulated cooking cavity, such that the imaging device extends into the insulated cooking cavity from inside the compartment through a space below the compartment.

A9. The cooking appliance of A8, wherein a resilient cover disposed around the imaging device seals an opening between the compartment and the space below the compartment.

B0. A cooking appliance comprising:

a cooking cavity having an opening on a front side of the cooking appliance;

a cooling fan disposed inside the cooking appliance above the cooking cavity;

one or more exhaust ports in fluid communication with the cooling fan;

a camera mounted in a compartment above the cooking cavity such that an electronics portion of the camera is disposed in the compartment and a lens portion of the camera extends into the insulated cooking cavity; and a first air intake disposed in an upper portion of a lateral wall of the cooking appliance;

wherein the cooling fan is configured to draw air from the first air intake through the compartment, and to exhaust the air through the one or more exhaust ports.

B1. The cooking appliance of B0, wherein the cooling fan comprises a centrifugal fan.

B2. The cooking appliance of B0 or B1, wherein the one or more exhaust ports are disposed adjacent a top edge of the opening.

B3. The cooking apparatus of any one of paragraphs B0 through B2, wherein the compartment is disposed above a front corner of the cooking cavity.

B4. The cooking apparatus of any one of paragraphs B0 through B3, wherein the first air intake is disposed in a top half of the lateral wall.

B5. The cooking apparatus of any one of paragraphs B0 through B4, wherein a second air intake is disposed below a bottom edge of the cooking cavity.

B6. The cooking appliance of any one of paragraphs B0 through B5, further comprising a hob disposed above the cooking cavity and the compartment.

B7. The cooking appliance of any one of paragraphs B0 through B6, further comprising a top panel installed above the cooling fan and the compartment, wherein the appliance is configured to provide access to the imaging device through a top of the appliance by removing the top panel and one or more service covers of the compartment.

B8. The cooking appliance of any one of paragraphs B0 through B7, wherein the compartment is spaced from a ceiling of the cooking cavity, such that the imaging device extends into the insulated cooking cavity from inside the compartment through a space below the compartment.

B9. The cooking appliance of B8, wherein a resilient cover disposed around the imaging device seals an opening between the compartment and the space below the compartment.

C0. A cooking appliance comprising:

a cooking cavity formed in a body of an oven;

a mounted imaging system configured to obtain images of the cooking cavity;

wherein the external housing includes:

a three-sided base portion having a front panel with an opening through which the cooking cavity may be accessed two removable lateral walls configured to couple to the three-sided base portion on opposite sides of the front panel;

a removable top panel configured to couple to a top end of at least the two removable lateral walls to close the exterior housing;

wherein the other internal components of the cooking appliance include:

an upper insulation retainer disposed within the exterior housing above the cooking cavity, an air conduction plate disposed within the exterior housing above the upper insulation retainer, a pair of airflow separators disposed between and coupled to the upper insulation retainer and air conduction plate, wherein the pair of airflow separators collectively define a rectangular space, an air channel exhaust plate disposed within the exterior housing above the air conduction plate, the air channel exhaust plate having a fan mounting aperture configured to receive a cooling fan, and wherein the air channel exhaust plate is configured to couple to a top surface of the air conduction plate to form a ducted housing, wherein the mounted imaging system is disposed at least partially within a compartment defined between a top surface of the upper insulation retainer, a bottom surface of the air conduction plate, and inner surfaces of the pair of airflow separators, wherein the compartment includes one or more service openings through which one or more components of the mounted imaging system may be accessed.

C1. The cooking appliance of C0, wherein the one or more service openings include a first service opening disposed in a portion of the air conduction plate that defines a top side of the compartment.

C2. The cooking appliance of C0 through C1, wherein the one or more service openings include a second service opening disposed in a portion of the upper insulation retainer that defines a bottom side of the compartment.

C3. The cooking appliance of C0 through C2, further comprising an outer removable service cover configured to couple to the air conduction plate over the first service opening.

C4. The cooking appliance of C0 through C3, further comprising an inner removable service cover configured to couple to the upper insulation retainer over the second service opening.

C5. The cooking appliance of C4, wherein the inner removable service cover comprises a flexible heat-resistant material.

C6. The cooking appliance of C4 through C5, wherein the inner removable service cover includes a centrally disposed mounting aperture and a slit extending from a periphery of the mounting aperture to an outer edge of the inner removable service cover, the mounting aperture configured to receive and hold a middle section of the camera assembly.

C7. The cooking appliance of C4 through C6, wherein the inner removable service cover further includes a pair of inward-facing flexible flaps formed by the slit, the inward-facing flexible flaps being resilient features configured to bend and reform around the middle section of the camera assembly pushed through the slit and into camera aperture.

C8. The cooking appliance of C4 through C7, wherein the inner removable service cover, by way of the mounting aperture is configured to allow the camera assembly to have a top section disposed in the compartment above the inner removable service cover while having a bottom section disposed outside of the compartment.

C9. The cooking appliance of C0 through C8, wherein the oven includes a plurality of cooling airflow pathways generated by way of the cooling fan and ducted housing.

C10. The cooking appliance of C0 through C9, wherein the plurality of cooling airflow pathways includes a compartment airflow pathway configured to provide targeted cooling to components of the mounted imaging system disposed within the compartment.

C11. The cooking appliance of C10, wherein the compartment airflow pathway brings air into an interior of the oven by way of a plurality of cooling air intake vents disposed in the removable lateral walls and configured to allow the passage of ambient air into the oven from a side of the oven.

C12. The cooking appliance of C0 through C11, wherein the upper insulation retainer includes a main insulation panel coupled on right and left sides to hook-shaped lateral ventilation troughs, the hook-shaped lateral ventilation troughs having an outer end configured to removably couple to the removable lateral walls below the plurality of cooling vents.

C13. The cooking appliance of C0 through C12, wherein the hook-shaped lateral ventilation troughs are configured to naturally separate warm air from cold air based on density, such that colder air sinks to a bottom portion of the lateral ventilation trough while warmer air remains in or above a top portion of the lateral ventilation trough.

C14. The cooking appliance of C13, wherein a ventilation channel is formed in the lateral ventilation troughs.

C15. The cooking appliance of C0 through C14, wherein the pair of airflow separators are coupled to the main insulation panel of the upper insulation retainer, and wherein an outer airflow separator of the pair of airflow separators includes a first arm configured to extend from the main insulation panel over lateral ventilation trough and downwards partially into the ventilation channel, to form a compartment air inlet.

C16. The cooking appliance of C15, wherein the outer airflow separator is configured to allow cold air present in the bottom portion of the lateral ventilation trough into the compartment by way of the compartment air inlet while blocking air present in or above the top portion of the lateral ventilation trough from entering.

Advantages, Features, and Benefits

The different embodiments and examples of the oven with a serviceable mounted imaging system described herein provide several advantages over known solutions for servicing and/or replacing components of an oven imaging system. For example, illustrative embodiments and examples described herein allow components of the mounted imaging system to be accessed by way of one or more openings in a compartment.

Additionally, and among other benefits, illustrative embodiments and examples described herein facilitate replacement and/or servicing of components of the mounted imaging system disposed within an oven.

Additionally, and among other benefits, illustrative embodiments and examples described herein provide a mounted imaging system disposed at least partially in a compartment arranged in an upper right front corner of the oven.

Additionally, and among other benefits, illustrative embodiments and examples described herein provide improved ventilation and cooling of heat-sensitive components of the mounted imaging system by way of a targeted compartment airflow pathway.

Additionally, and among other benefits, illustrative embodiments and examples described herein provide an oven configured to bring air into an interior of the oven from a side of the oven by way of a plurality of cooling vents.

Additionally, and among other benefits, illustrative embodiments and examples described herein provide a compartment in which components of the mounted imaging system are at least partially isolated from warm air of the oven and receive cool air brought in from a side of the oven by way of a plurality of cooling vents and a targeted compartment airflow pathway.

Additionally, and among other benefits, illustrative embodiments and examples described herein provide an oven configured to separate cold air from warm air and divert the cold air into a compartment to cool components of the mounted imaging system while blocking the warm air.

Additionally, and among other benefits, illustrative embodiments and examples described herein provide an insulated compartment in which components of the mounted imaging system are at least partially disposed to obtain heat protection and which can be accessed by way of a first service opening and an outer removable service cover configured to cover the first service opening.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A cooking appliance comprising:

an insulated cooking cavity having an opening selectively closed by an access door on a front side of the cooking appliance;

an air mover disposed inside the cooking appliance above the insulated cooking cavity, the air mover configured to force air through one or more exhaust ports of the cooking appliance;

an imaging device mounted in a compartment above the insulated cooking cavity and extending into the insulated cooking cavity, such that an interior of the insulated cooking cavity is viewable by the imaging device; and a first air intake disposed in a lateral wall of the cooking appliance, the first air intake configured to receive air into the cooking appliance from a space external to the cooking appliance;

wherein the compartment is in fluid communication with an inlet of the air mover and with the first air intake, such that an airflow pathway extends from the first air intake through the compartment to the one or more exhaust ports;

wherein the compartment is spaced from a ceiling of the insulated cooking cavity, such that the imaging device extends into the insulated cooking cavity from inside the compartment through a space below the compartment; and wherein a removable service cover disposed around the imaging device seals an opening between the compartment and the space below the compartment, the removable service cover defining an aperture through which the imaging device extends when the removable service cover is installed, wherein a maximum diameter of the aperture is less than a maximum diameter of the imaging device.

2. The cooking appliance of claim 1, wherein the air mover comprises a centrifugal fan.

3. The cooking appliance of claim 1, wherein the one or more exhaust ports are disposed adjacent a top edge of the opening of the insulated cooking cavity.

4. The cooking appliance of claim 1, wherein the compartment is disposed above a front corner of the cooking cavity.

5. The cooking appliance of claim 1, wherein the first air intake is disposed in a top half of the lateral wall.

6. The cooking appliance of claim 1, wherein a second air intake is disposed below a bottom edge of the access door.

7. The cooking appliance of claim 1, further comprising a hob disposed above the cooking cavity and the air mover.

8. The cooking appliance of claim 1, further comprising a top panel installed above the air mover and the compartment, wherein the appliance is configured to provide access to the imaging device through a top of the appliance by removing the top panel and one or more service covers of the compartment.

9. The cooking appliance of claim 1, wherein the removable service cover further defines a slit extending from a periphery of the aperture, the slit configured to form a pair of inward-facing flexible flaps in the removable service cover, wherein the flaps are configured to facilitate insertion of the imaging device through the aperture.

10. A cooking appliance comprising:

a cooking cavity having an opening on a front side of the cooking appliance;

a cooling fan disposed inside the cooking appliance above the cooking cavity;

one or more exhaust ports in fluid communication with the cooling fan;

a camera mounted in a compartment above the cooking cavity such that an electronics portion of the camera is disposed in the compartment and a lens portion of the camera extends into the cooking cavity; and a first air intake disposed in an upper portion of a lateral wall of the cooking appliance;

wherein the cooling fan is configured to draw air from the first air intake through the compartment, and to exhaust the air through the one or more exhaust ports;

wherein the compartment is spaced from a ceiling of the cooking cavity, such that the camera extends into the cooking cavity from inside the compartment through a space below the compartment; and wherein a removable service cover disposed around the camera seals an opening between the compartment and the space below the compartment, the removable service cover defining an aperture through which the camera extends when the removable service cover is installed, wherein a maximum diameter of the aperture is less than a maximum diameter of the camera.

11. The cooking appliance of claim 10, wherein the cooling fan comprises a centrifugal fan.

12. The cooking appliance of claim 10, wherein the one or more exhaust ports are disposed adjacent a top edge of the opening of the cooking cavity.

13. The cooking appliance of claim 10, wherein the compartment is disposed above a front corner of the cooking cavity.

14. The cooking appliance of claim 10, wherein the first air intake is disposed in a top half of the lateral wall.

15. The cooking appliance of claim 10, wherein a second air intake is disposed below a bottom edge of the cooking cavity.

16. The cooking appliance of claim 10, further comprising a hob disposed above the cooking cavity and the compartment.

17. The cooking appliance of claim 10, further comprising a top panel installed above the cooling fan and the compartment, wherein the appliance is configured to provide access to the camera through a top of the appliance by removing the top panel and one or more service covers of the compartment.

18. The cooking appliance of claim 10, wherein the removable service cover further defines a slit extending from a periphery of the aperture, the slit configured to form a pair of inward-facing flexible flaps in the removable service cover, wherein the flaps are configured to facilitate insertion of the camera through the aperture.

* * * * *